(12) United States Patent
Kimura

(10) Patent No.: US 9,549,187 B2
(45) Date of Patent: Jan. 17, 2017

(54) INTRA PREDICTION MODE DETERMINATION APPARATUS, INTRA PREDICTION MODE DETERMINATION METHOD, AND RECORDING MEDIUM

(71) Applicant: CANON KABUSHIKI KAISHA, Tokyo (JP)

(72) Inventor: Makoto Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 14/572,567

(22) Filed: Dec. 16, 2014

(65) Prior Publication Data

US 2015/0181210 A1  Jun. 25, 2015

(30) Foreign Application Priority Data

Dec. 19, 2013 (JP) .................................. 2013-262758

(51) Int. Cl.
| | | |
|---|---|---|
| *H04N 19/14* | (2014.01) | |
| *H04N 19/176* | (2014.01) | |
| *H04N 19/119* | (2014.01) | |
| *H04N 19/11* | (2014.01) | |
| *H04N 19/436* | (2014.01) | |
| *H04N 19/154* | (2014.01) | |

(52) U.S. Cl.
CPC .............. *H04N 19/14* (2014.11); *H04N 19/11* (2014.11); *H04N 19/119* (2014.11); *H04N 19/176* (2014.11); *H04N 19/436* (2014.11); *H04N 19/154* (2014.11)

(58) Field of Classification Search
CPC .... H04N 19/105; H04N 19/11; H04N 19/119; H04N 19/134; H04N 19/14; H04N 19/176; H04N 19/436; H04N 19/597
See application file for complete search history.

(56) References Cited

U.S. PATENT DOCUMENTS

| | | | | |
|---|---|---|---|---|
| 2011/0150341 A1* | 6/2011 | Yamamoto | ........... | G06K 9/4604 382/190 |
| 2013/0088570 A1* | 4/2013 | Takahashi | .......... | H04N 13/0048 348/43 |

FOREIGN PATENT DOCUMENTS

| | | |
|---|---|---|
| JP | 2007-266679 A | 10/2007 |
| JP | 2011-151655 A | 8/2011 |

OTHER PUBLICATIONS

ITU-T H.265(Apr. 2013) High efficiency video coding, pp. 1-317.

* cited by examiner

*Primary Examiner* — Jingge Wu
(74) *Attorney, Agent, or Firm* — Canon U.S.A., Inc. IP Division

(57) ABSTRACT

An intra prediction mode determination apparatus includes prediction units which perform intra prediction on a block of a first block size in an image including at least one block, a first determination unit which determines one of the prediction units used to perform the intra prediction on the block of a processing target, and a second determination unit which determines an intra prediction mode for the block of the processing target from among candidates of an intra prediction mode which are used by the determined prediction unit in accordance with a result of the intra prediction performed by the determined prediction unit. When the block of the processing target includes a block of a second block size which is larger than the first block size, the prediction unit performs intra prediction on blocks of the first block size obtained by dividing the block of the second block size.

7 Claims, 22 Drawing Sheets

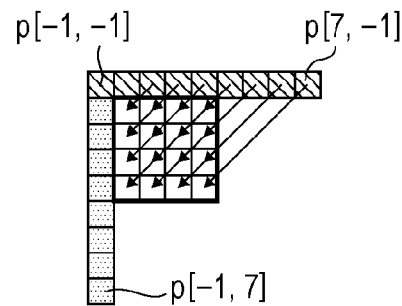
FIG. 5A
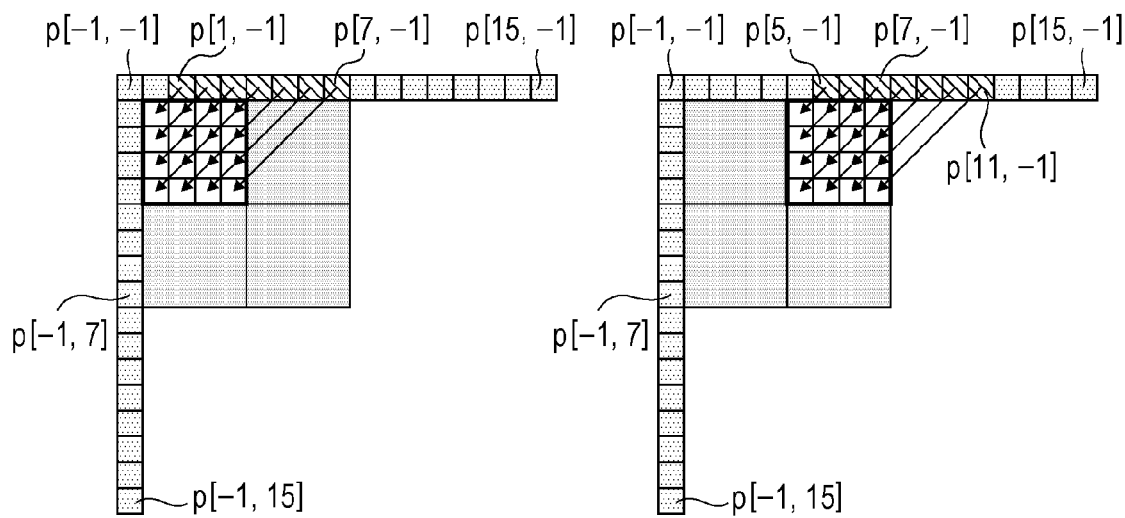
FIG. 5B
FIG. 5C
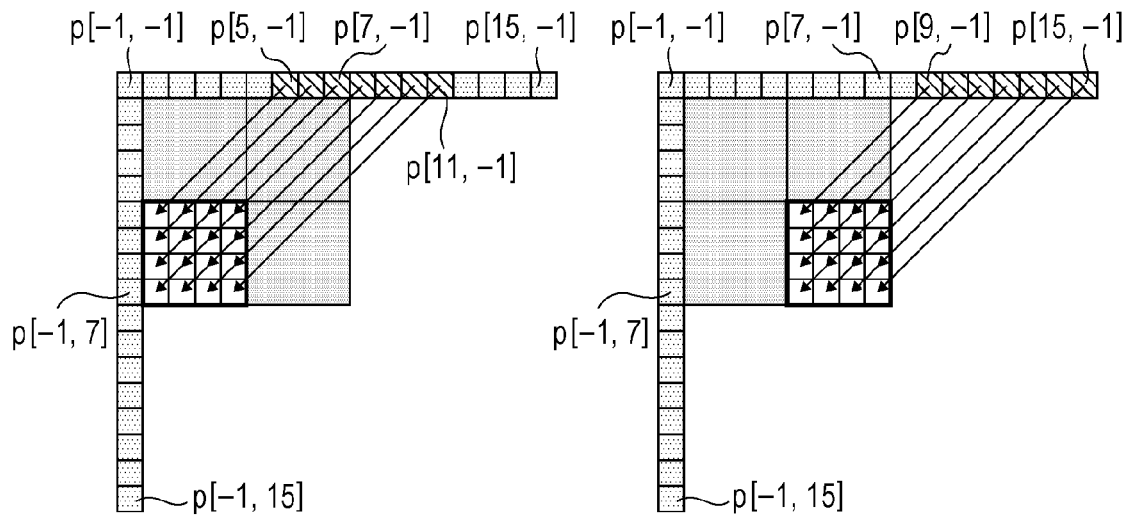
FIG. 5D
FIG. 5E

FIG. 8

| 1 | 2 | 5 |
|---|---|---|
| 3 | 4 | |
| 6 | 7 | 10 |
| 8 | 9 | |

☐ 4×4 PU SIZE
PU: PREDICTION UNIT

FIG. 9A

| INTRA PREDICTION UNIT | PROCESSING BLOCK | PREDICTION MODE |
|---|---|---|
| 4×4 INTRA PREDICTION UNIT 1 | BLOCK 1 | PREDICTION MODE 0 |
| 4×4 INTRA PREDICTION UNIT 2 | BLOCK 1 | PREDICTION MODE 1 |
| 4×4 INTRA PREDICTION UNIT 3 | BLOCK 2 | PREDICTION MODE 0 |
| 4×4 INTRA PREDICTION UNIT 4 | BLOCK 2 | PREDICTION MODE 1 |
| 4×4 INTRA PREDICTION UNIT 5 | BLOCK 3 | PREDICTION MODE 0 |
| 4×4 INTRA PREDICTION UNIT 6 | BLOCK 3 | PREDICTION MODE 1 |
| 4×4 INTRA PREDICTION UNIT 7 | BLOCK 4 | PREDICTION MODE 0 |
| 4×4 INTRA PREDICTION UNIT 8 | BLOCK 4 | PREDICTION MODE 1 |
| 4×4 INTRA PREDICTION UNIT 9-12 | BLOCK 5 | PREDICTION MODE 0 |
| 4×4 INTRA PREDICTION UNIT 13-16 | BLOCK 5 | PREDICTION MODE 1 |
| 4×4 INTRA PREDICTION UNIT 17 | BLOCK 6 | PREDICTION MODE 0 |
| 4×4 INTRA PREDICTION UNIT 18 | BLOCK 6 | PREDICTION MODE 1 |
| 4×4 INTRA PREDICTION UNIT 19 | BLOCK 7 | PREDICTION MODE 0 |
| 4×4 INTRA PREDICTION UNIT 20 | BLOCK 7 | PREDICTION MODE 1 |
| 4×4 INTRA PREDICTION UNIT 21 | BLOCK 8 | PREDICTION MODE 0 |
| 4×4 INTRA PREDICTION UNIT 22 | BLOCK 8 | PREDICTION MODE 1 |
| 4×4 INTRA PREDICTION UNIT 23 | BLOCK 9 | PREDICTION MODE 0 |
| 4×4 INTRA PREDICTION UNIT 24 | BLOCK 9 | PREDICTION MODE 1 |
| 4×4 INTRA PREDICTION UNIT 25-28 | BLOCK 10 | PREDICTION MODE 0 |
| 4×4 INTRA PREDICTION UNIT 29-32 | BLOCK 10 | PREDICTION MODE 1 |

FIG. 9B

| INTRA PREDICTION UNIT | PROCESSING BLOCK | PREDICTION MODE |
|---|---|---|
| 4×4 INTRA PREDICTION UNIT 1 | BLOCK 5 | PREDICTION MODE 18 |
| 4×4 INTRA PREDICTION UNIT 2 | BLOCK 5 | PREDICTION MODE 18 |
| 4×4 INTRA PREDICTION UNIT 3 | BLOCK 5 | PREDICTION MODE 18 |
| 4×4 INTRA PREDICTION UNIT 4 | BLOCK 5 | PREDICTION MODE 18 |
| 4×4 INTRA PREDICTION UNIT 5 | BLOCK 5 | PREDICTION MODE 19 |
| 4×4 INTRA PREDICTION UNIT 6 | BLOCK 5 | PREDICTION MODE 19 |
| 4×4 INTRA PREDICTION UNIT 7 | BLOCK 5 | PREDICTION MODE 19 |
| 4×4 INTRA PREDICTION UNIT 8 | BLOCK 5 | PREDICTION MODE 19 |
| 4×4 INTRA PREDICTION UNIT 9-12 | BLOCK 5 | PREDICTION MODE 20 |
| 4×4 INTRA PREDICTION UNIT 13-16 | BLOCK 5 | PREDICTION MODE 21 |
| 4×4 INTRA PREDICTION UNIT 17 | BLOCK 10 | PREDICTION MODE 18 |
| 4×4 INTRA PREDICTION UNIT 18 | BLOCK 10 | PREDICTION MODE 18 |
| 4×4 INTRA PREDICTION UNIT 19 | BLOCK 10 | PREDICTION MODE 18 |
| 4×4 INTRA PREDICTION UNIT 20 | BLOCK 10 | PREDICTION MODE 18 |
| 4×4 INTRA PREDICTION UNIT 21 | BLOCK 10 | PREDICTION MODE 19 |
| 4×4 INTRA PREDICTION UNIT 22 | BLOCK 10 | PREDICTION MODE 19 |
| 4×4 INTRA PREDICTION UNIT 23 | BLOCK 10 | PREDICTION MODE 19 |
| 4×4 INTRA PREDICTION UNIT 24 | BLOCK 10 | PREDICTION MODE 19 |
| 4×4 INTRA PREDICTION UNIT 25-28 | BLOCK 10 | PREDICTION MODE 20 |
| 4×4 INTRA PREDICTION UNIT 29-32 | BLOCK 10 | PREDICTION MODE 21 |

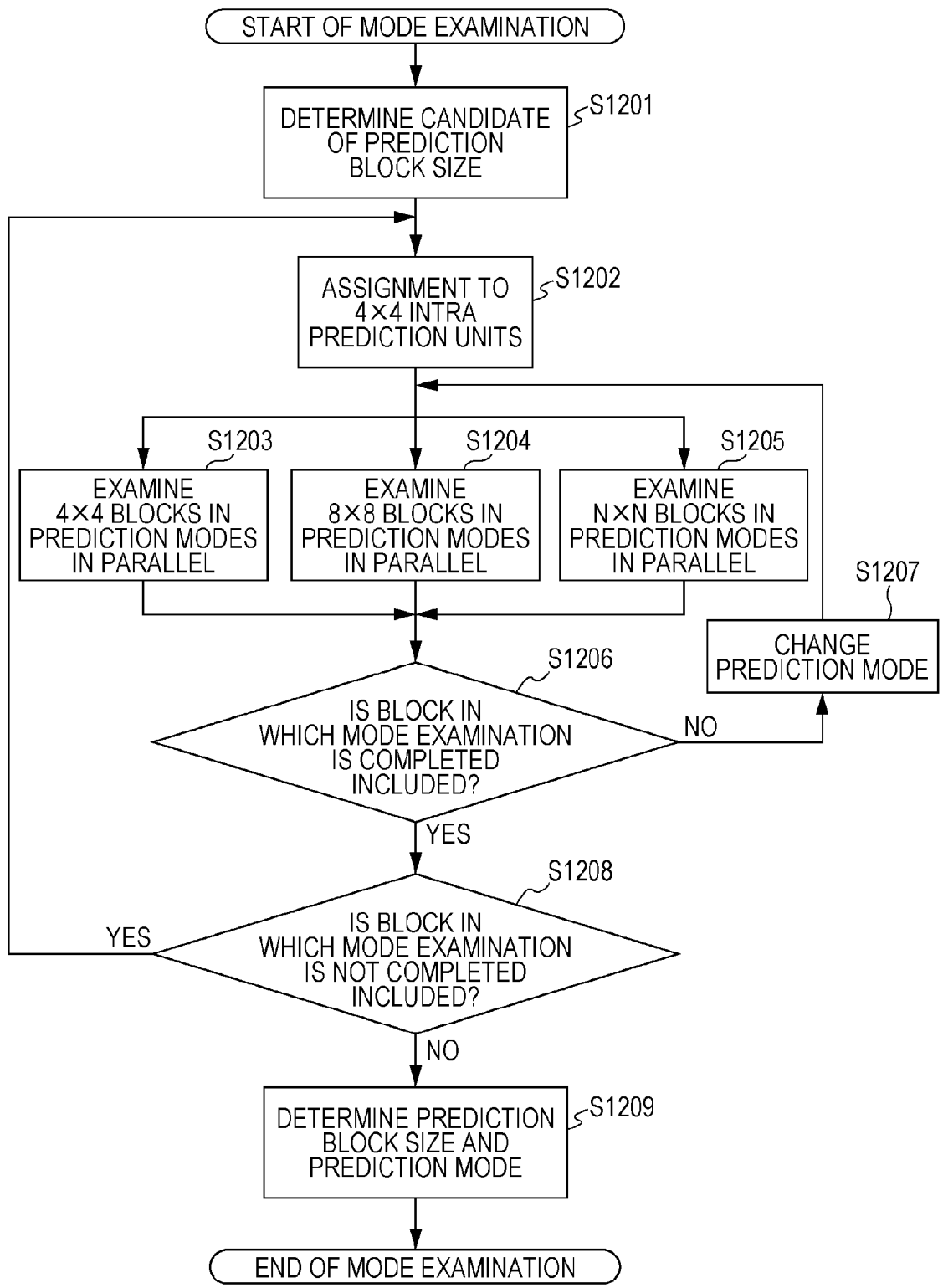

FIG. 13A
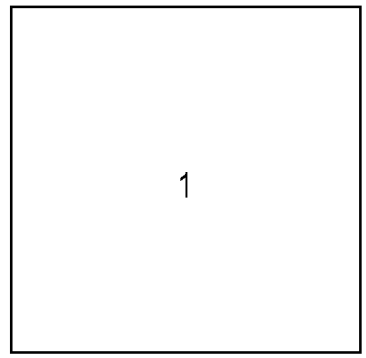
FIG. 13B
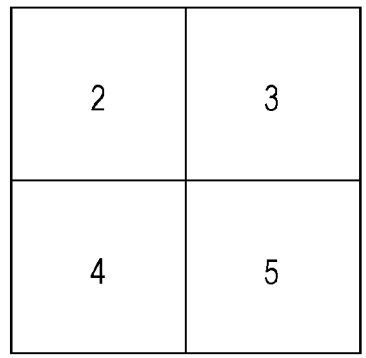
FIG. 13C
| 6 | 7 | 10 | 11 |
|---|---|----|----|
| 8 | 9 | 12 | 13 |
| 14 | 15 | 18 | 19 |
| 16 | 17 | 20 | 21 |

FIG. 14

| INTRA PREDICTION UNIT | PROCESSING BLOCK | PREDICTION MODE |
|---|---|---|
| 4×4 INTRA PREDICTION UNIT 1-16 | 16×16 BLOCK 1 | PREDICTION MODE 0 |
| 4×4 INTRA PREDICTION UNIT 17-20 | 8×8 BLOCK 2 | PREDICTION MODE 0 |
| 4×4 INTRA PREDICTION UNIT 21-24 | 8×8 BLOCK 2 | PREDICTION MODE 1 |
| 4×4 INTRA PREDICTION UNIT 25 | 4×4 BLOCK 6 | PREDICTION MODE 0 |
| 4×4 INTRA PREDICTION UNIT 26 | 4×4 BLOCK 6 | PREDICTION MODE 1 |
| 4×4 INTRA PREDICTION UNIT 27 | 4×4 BLOCK 6 | PREDICTION MODE 2 |
| 4×4 INTRA PREDICTION UNIT 28 | 4×4 BLOCK 6 | PREDICTION MODE 3 |
| 4×4 INTRA PREDICTION UNIT 29 | 4×4 BLOCK 6 | PREDICTION MODE 4 |
| 4×4 INTRA PREDICTION UNIT 30 | 4×4 BLOCK 6 | PREDICTION MODE 5 |
| 4×4 INTRA PREDICTION UNIT 31 | 4×4 BLOCK 6 | PREDICTION MODE 6 |
| 4×4 INTRA PREDICTION UNIT 32 | 4×4 BLOCK 6 | PREDICTION MODE 7 |

FIG. 20A

| PREDICTION BLOCK SIZE | THE NUMBER OF PREDICTION MODES |
|---|---|
| 4×4 | 18 |
| 8×8 | 35 |
| 16×16 | 35 |
| 32×32 | 35 |
| 64×64 | 4 |

FIG. 20B

| INTRA PREDICTION MODE | ASSOCIATED NAMES |
|---|---|
| 0 | Intra_Planar |
| 1 | Intra_Vertical |
| 2 | Intra_Horizontal |
| 3 | Intra_DC |
| 4-33 | Intra_Angular |
| 34 | Intra_FromLuma |

INTRA PREDICTION MODE DETERMINATION APPARATUS, INTRA PREDICTION MODE DETERMINATION METHOD, AND RECORDING MEDIUM

BACKGROUND OF THE INVENTION

Field of the Invention

The present invention relates to an apparatus and a method for determining intra prediction mode when intra prediction encoding is performed on an image, and a recording medium.

Description of the Related Art

As a method for encoding moving images, H.264/MPEG-4 AVC (hereinafter simply referred to as "H.264") is generally used. Furthermore, as a successor method of H.264, activity of international standardization of an encoding method of higher efficiency is started and JCT-VC (Joint Collaborative Team on Video Coding) is established by ISO/IEC and ITU-T. In the JCT-VC, standardization of a high efficiency video coding method (hereinafter referred to as "HEVC") is promoted (refer to ITU-T H.265(04/2013) High efficiency video coding).

In the HEVC, intra prediction encoding in which a prediction residual (prediction error) generated by performing intra-frame prediction (hereinafter referred to as "intra prediction") using correlations among pixels in a frame (image) is encoded is employed in order to improve encoding efficiency. Furthermore, in the HEVC, as a size of a prediction block which is a unit of intra prediction (hereinafter referred to as a "prediction block size"), one of five types of sizes including 64×64 pixels, 32×32 pixels, 16×16 pixels, 8×8 pixels, and 4×4 pixels is employed. Note that the term "64×64 pixels" represents a block having pixels in a matrix of 64 rows and 64 columns, and in this embodiment, this block is referred to as "64×64 pixels" hereinafter. The same is true of blocks having the other numbers of pixels. Furthermore, in the HEVC, encoding by combining a plurality of block sizes has been discussed. In an example of FIG. 8, intra prediction of a block size of 4×4 pixels and intra prediction of a block size of 8×8 pixels are combined with each other. In this way, in the HEVC, intra prediction may be performed on a single encoding block by a plurality of prediction block sizes. The pixels are constituted by samples of luminance components and chrominance components. In a case of 64×64 pixels in the YUV420 format, the pixels are constituted by 64×64 samples of luminance components and two 32×32 samples of chrominance components. Here, for sake of simplicity of description, the term "pixel" and the term "sample" are described as synonymous with each other. Specifically, the term "pixel" may be replaced by the term "sample" in the description hereinafter.

Furthermore, the number of prediction modes of the prediction block sizes in the HEVC is 4 in the block size of 64×64 pixels, 35 in the block sizes of 32×32 pixels, 16×16 pixels, and 8×8 pixels, and 18 in the block size of 4×4 pixels (refer to FIG. 20A). Furthermore, modes (Associated names) associated with prediction modes 0 to 34 (intra prediction modes) are illustrated in FIG. 20B. In FIG. 20B, an Intra_Angular mode is associated to the prediction modes 4 to 33, and a method for generating a prediction image is shared by the prediction modes 4 to 33.

When the intra prediction is performed using such an encoding method, a large prediction error is generated, and therefore, encoding efficiency is lowered unless an appropriate combination between one of a plurality of available prediction modes and one of the plurality of block sizes is selected. Therefore, all available prediction modes and all available prediction block sizes are examined and an appropriate one of the prediction modes and an appropriate one of the prediction block size are selected.

Furthermore, in a case where all the prediction modes and all the prediction block sizes are to be examined, if the plurality of block sizes are examined in parallel, a processing time required for encoding may be reduced. However, special hardware is required for the examinations of the block sizes and the prediction modes, and accordingly, a circuit size is increased. As a technique for suppressing the increase of a circuit size, in general, techniques disclosed in Japanese Patent Laid-Open Nos. 2011-151655 and 2007-266679 have been proposed. The technique employed in Japanese Patent Laid-Open No. 2011-151655 employs a configuration in which a single intra prediction unit may determine intra prediction modes of a plurality of macro block sizes, and reduction of a circuit size of a moving-image encoding unit is realized. In Japanese Patent Laid-Open No. 2007-266679, a circuit size is reduced by performing examinations of a block of 16×16 pixels in various intra prediction modes using a prediction unit which performs prediction on a block of 4×4 pixels while the block of 4×4 pixels is locally decoded.

However, in Japanese Patent Laid-Open No. 2011-151655, the plurality of encoding blocks are successively examined in various prediction modes using the single intra prediction unit. Therefore, when an encoding method having a large number of available prediction modes and a large number of available types of prediction block size, such as the HEVC, is employed, the following problem arises. Specifically, in this case, a processing time required for a determination of a prediction mode and a prediction block size for one encoding block is increased, and as a result, processing performance of an entire encoding apparatus is degraded.

Similarly, when the HEVC is employed in Japanese Patent Laid-Open No. 2007-266679, the number of prediction modes to be examined for each prediction block size is increased, and therefore, a period of time required for a determination of a prediction mode for one prediction block is increased. Furthermore, when an encoding block constituted by a plurality of prediction block sizes as illustrated in FIG. 8 is encoded in Japanese Patent Laid-Open No. 2007-266679, a processing time required for the local decoding and a processing time required for generation of a prediction image are considerably changed depending on a prediction block size to be processed. Therefore, a period of time in which an incorporated calculation unit is stopped is generated, and accordingly, the calculation unit is not efficiently used.

On the basis of the problems above, the present invention provides, in a process of examining a plurality of prediction block sizes in various intra prediction modes, a determination of an appropriate prediction block size and an appropriate prediction mode at high speed while increase of a circuit size is suppressed.

SUMMARY OF THE INVENTION

A representative intra prediction mode determination apparatus has the following configuration. Specifically, the intra prediction mode determination apparatus includes a plurality of prediction units configured to perform intra prediction on a block of a first block size in an image including at least one block, a first determination unit configured to determine one of the prediction units used to perform the intra prediction on the block of a processing target, and a second determination unit configured to determine an intra prediction mode for the block of the processing target from among a plurality of candidates of an intra prediction mode which are used by the determined prediction unit in accordance with a result of the intra prediction performed by the prediction unit determined by the first determination unit. When the block of the processing target includes a block of a second block size which is larger than the first block size, the prediction unit determined by the first determination unit performs intra prediction on a plurality of blocks of the first block size obtained by dividing the block of the second block size.

Further features of the present invention will become apparent from the following description of exemplary embodiments with reference to the attached drawings.

In a process of determining intra prediction modes, an appropriate prediction block size and an appropriate prediction mode may be determined at high speed while increase of a circuit size is suppressed.

BRIEF DESCRIPTION OF THE DRAWINGS

FIGS. 5A to 5E are diagrams illustrating an intra prediction process of an 8×8 block using a 4×4 intra prediction unit.

FIG. 8 is a diagram illustrating a combination of prediction block sizes in intra prediction of HEVC.

FIGS. 9A and 9B are diagrams illustrating assignment of prediction blocks of processing targets to 4×4 intra prediction units according to the first embodiment.

FIG. 12 is a flowchart illustrating a processing flow of the intra prediction mode determination apparatus according to the second embodiment.

FIGS. 13A to 13C are diagrams illustrating candidates of a prediction block size.

FIG. 14 is a diagram illustrating assignment of prediction blocks of processing targets to 4×4 intra prediction units according to the second embodiment.

FIGS. 20A and 20B are diagrams illustrating intra prediction modes of HEVC.

DESCRIPTION OF THE EMBODIMENTS

Figure 1:
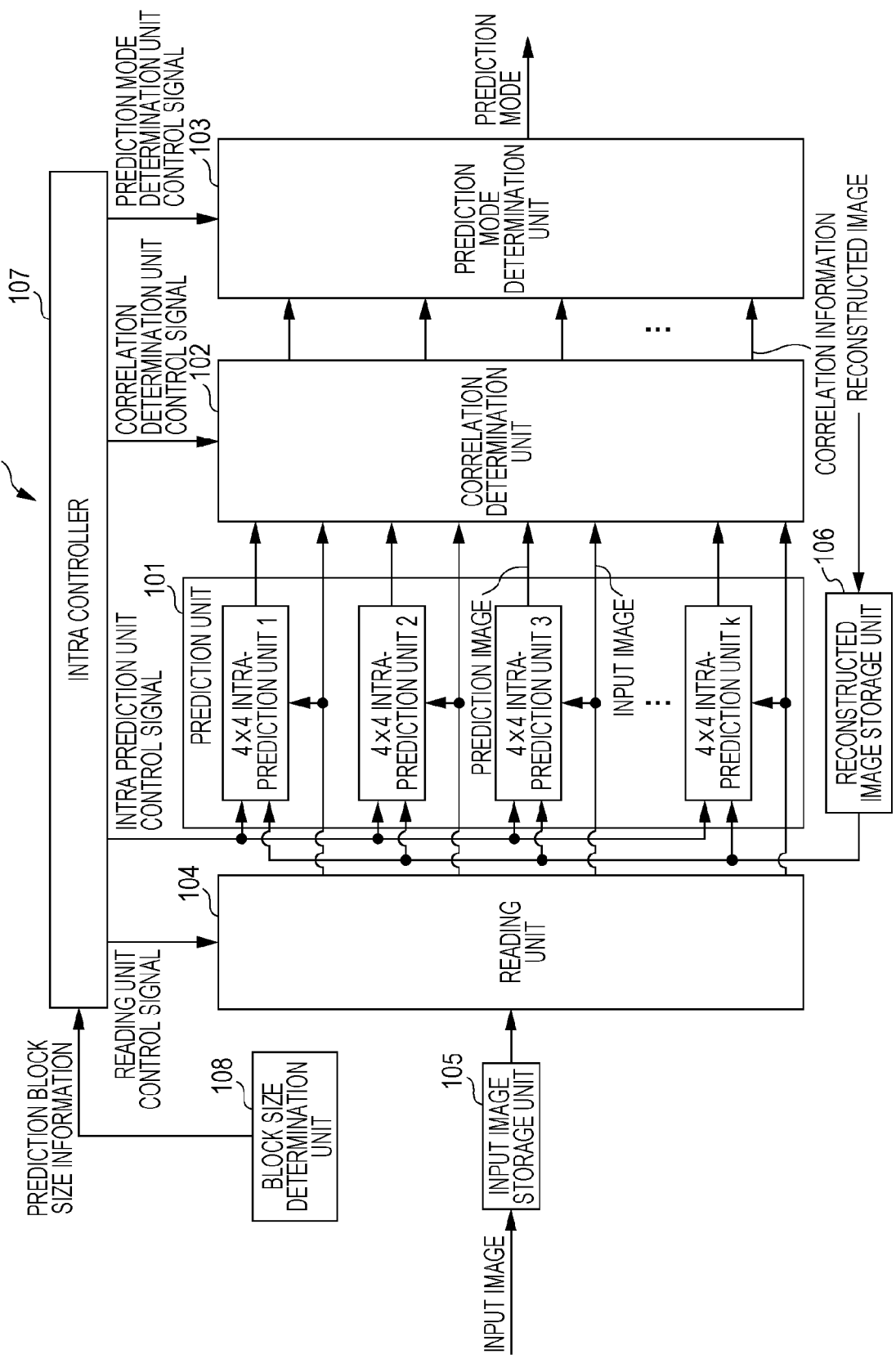
FIG. 1 is a block diagram illustrating an intra prediction mode determination apparatus according to a first embodiment.

Embodiments of the present invention will be described hereinafter with reference to the accompanying drawings. Configurations in the embodiments below are merely examples, and the present invention is not limited to the illustrated configurations.

An example of an image encoding apparatus including an intra prediction mode determination apparatus to which the embodiments are applied will be described with reference to FIG. 2. An image encoding apparatus 200 of the embodiments illustrated in FIG. 2 includes an apparatus controller 1001, an orthogonal transform unit 1002, a quantization unit 1003, and an entropy encoding unit 1004. The image encoding apparatus 200 further includes an inverse quantization unit 1005, an inverse orthogonal transform unit 1006, an adder 1007, an intra prediction unit 1008, a subtractor 1009, a filter unit 1010, a motion vector search unit 1011, an inter prediction unit 1012, and a selector 1013.

When intra prediction (intra frame prediction) encoding is performed on an image (input frame) input to the image encoding apparatus 200 of the embodiments, the intra prediction unit 1008 performs an intra prediction process on the input image so as to generate a prediction image. Furthermore, the intra prediction unit 1008 outputs the generated prediction image to the subtractor 1009 through the selector 1013. The subtractor 1009 calculates a difference between the image input to the image encoding apparatus 200 and the prediction image supplied from the intra prediction unit 1008 so as to generate a prediction residual. Furthermore, the subtractor 1009 outputs the generated prediction residual to the orthogonal transform unit 1002.

The orthogonal transform unit 1002 performs orthogonal transform on the prediction residual supplied from the subtractor 1009 so as to generate an orthogonal transform coefficient. The quantization unit 1003 performs quantization on the orthogonal transform coefficient generated by the orthogonal transform unit 1002 so as to generate a quantization coefficient. The quantization unit 1003 outputs the generated quantization coefficient to the entropy coding unit 1004 and the inverse quantization unit 1005. The entropy encoding unit 1004 encodes the quantization coefficient supplied from the quantization unit 1003 so as to generate an encoded stream. Furthermore, the entropy encoding unit 1004 outputs the generated encoded stream outside the image encoding apparatus 200.

Furthermore, to obtain a reconstructed image (a reconstructed frame), the following process is performed. The inverse quantization unit 1005 performs inverse quantization on the quantization coefficient supplied from the quantization unit 1003. Furthermore, the inverse orthogonal transform unit 1006 performs inverse orthogonal transform on the quantization coefficient which has been subjected to the inverse quantization by the inverse quantization unit 1005 so as to restore (obtain) the prediction residual. Then the inverse orthogonal transform unit 1006 outputs the restored prediction residual to the adder 1007. The adder 1007 adds the prediction residual restored by the inverse orthogonal transform unit 1006 and the prediction image generated by the intra prediction unit 1008 to each other and outputs a resultant image to the filter unit 1010 and the intra prediction unit 1008. The filter unit 1010 performs a filter process on the image supplied from the adder 1007 so as to generate a reconstructed image. The filter unit 1010 stores the generated reconstructed image in a storage unit, not illustrated. Note that, when inter prediction (inter-frame prediction and motion compensation prediction) encoding is to be performed on the image input to the image encoding apparatus 200, the reconstructed image stored in the storage unit is referred to so that the inter prediction is performed on the input image.

Figure 2:
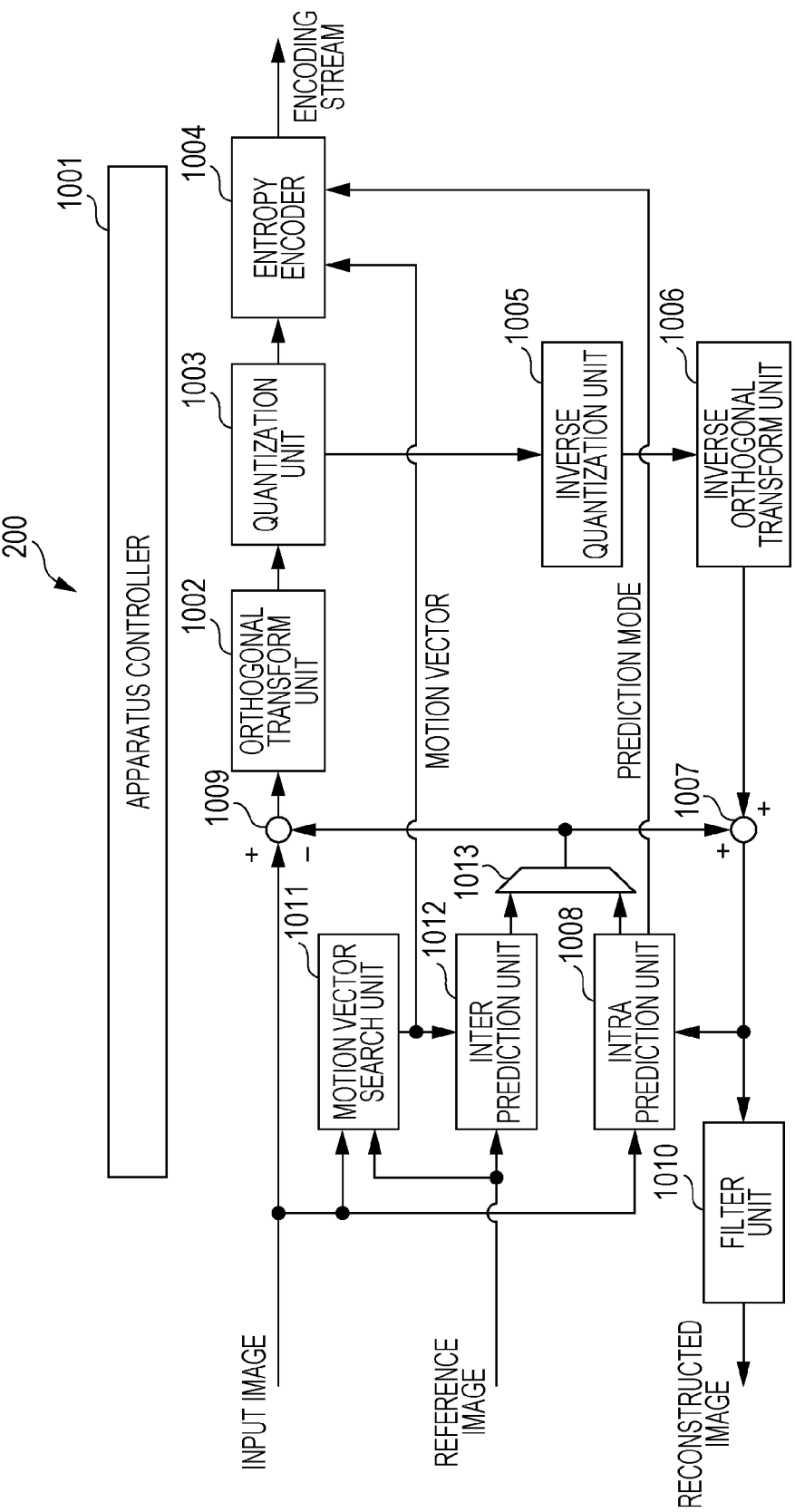
FIG. 2 is a block diagram illustrating an image encoding apparatus according to the first embodiment.

The control on the processing units illustrated in FIG. 2 is performed in accordance with control signals supplied from the apparatus controller 1001. The image encoding apparatus 200 further includes the motion vector search unit 1011 and the inter prediction unit 1012 which are processing units for performing the inter prediction. However, the motion vector search unit 1011 and the inter prediction unit 1012 are not directly associated with the embodiments, and accordingly, descriptions of operations of the motion vector search unit 1011 and the inter prediction unit 1012 to be performed when the inter prediction is performed are omitted. The intra prediction mode determination apparatus of the embodiments is applicable to an intra prediction mode determination unit incorporated in the intra prediction unit 1008 illustrated in FIG. 2.

Note that a term "8×8 pixels" represents a block including pixels in a matrix of 8 rows and 8 columns which is referred to as "8×8" in the embodiments. The same is true of a case where the number of pixels is changed.

First Embodiment

FIG. 1 is a block diagram illustrating an intra prediction mode determination apparatus 100 according to a first embodiment. The intra prediction mode determination apparatus 100 is included in the intra prediction unit 1008 of FIG. 2, and determines an intra prediction mode to be used when intra prediction is performed on an input image by the intra prediction unit 1008. The intra prediction mode determination apparatus 100 of this embodiment includes an intra prediction unit 101, a correlation determination unit 102, a prediction mode determination unit 103, a reading unit 104, and an input image storage unit 105. The intra prediction mode determination apparatus 100 further includes a reconstructed image storage unit 106, an intra controller 107, and a block size determination unit 108. Hereinafter, an operation of the intra prediction mode determination apparatus 100 of this embodiment will be described with reference to FIG. 1.

The input image storage unit 105 stores an image input to the intra prediction mode determination apparatus 100 of this embodiment. The reading unit 104 reads the input image stored in the input image storage unit 105 in accordance with a reading unit control signal supplied from the intra controller 107 and outputs the input image to the intra prediction unit 101 and the correlation determination unit 102 in a subsequent stage in parallel.

The intra prediction unit 101 includes a plurality of (k) 4×4 intra prediction units (k 4×4 intra prediction units 1 to k). Each of the 4×4 intra prediction units 1 to k generates an intra prediction image (hereinafter simply referred to as a "prediction image") using peripheral pixels of a 4×4 block of a prediction target as reference pixels in accordance with an intra prediction unit control signal supplied from the intra controller 107. Then each of the 4×4 intra prediction units 1 to k outputs the generated prediction image to the correlation determination unit 102.

The 4×4 intra prediction units 1 to k support a plurality of prediction modes available for the intra prediction and may be operated in parallel. The intra prediction unit control signal supplied from the intra controller 107 to the intra prediction unit 101 includes a prediction mode, a prediction block size, a coordinate of a pixel in an upper left end of the 4×4 block to be processed, coordinates of the reference pixels, and the like which are used for the intra prediction. The intra prediction unit control signal of this embodiment is not limited to this, and information other than the items described above may be included as long as information on at least one of the items described above is included. Furthermore, the intra prediction unit 101 of this embodiment uses one of an input image of an adjacent block input by the reading unit 104 and a reconstructed image stored in the reconstructed image storage unit 106 as the reference pixels. Furthermore, the reference pixels used for generating the prediction image may be obtained by specifying coordinates of the reference pixels by the 4×4 intra prediction units 1 to k or by specifying required pixels by another processing unit and directly inputting the pixels to the 4×4 intra prediction units 1 to k.

The correlation determination unit 102 determines correlation between one of prediction images of prediction mode candidates input by the 4×4 intra prediction units 1 to k and the input image of the 4×4 block to be predicted in accordance with a correlation determination unit control signal supplied from the intra controller 107. In this embodiment, the correlation determination unit 102 calculates a sum of absolute differences (SAD) as the correlation between the prediction image and the input image and outputs the SAD to the prediction mode determination unit 103 as a correlation determination result (correlation information). The determination method is not limited to the method described above, and various general methods are applicable. Furthermore, an SAD of a block of a size larger than the 4×4 block (an 8×8 block, for example) is to be calculated, an SAD of each of block sizes may be calculated by integrating SADs calculated in a unit of 4×4 block or a calculation unit which calculates an SAD may be provided for each prediction block size.

The prediction mode determination unit 103 selects a prediction mode having the smallest SAD from prediction mode candidates for each prediction block size in accordance with the prediction mode determination unit control signal supplied from the intra controller 107 and the correlation information supplied from the correlation determination unit 102. Here, a prediction error corresponding to the prediction mode having the smallest SAD may be stored in the prediction mode determination unit 103 or another processing unit. By this, although a circuit size is increased, intra prediction in a selected prediction mode is not required to be performed again, and therefore, a processing time may be reduced.

The reconstructed image storage unit 106 stores pixels which are included in the restored reconstructed image described with reference to FIG. 2 and which are to be at least referred to in intra prediction to be performed later. The intra controller 107 outputs the control signals to the intra prediction unit 101, the correlation determination unit 102, the prediction mode determination unit 103, and the reading unit 104 in accordance with information on a prediction block size supplied from the block size determination unit 108. The block size determination unit 108 determines a prediction block size which is a target for determining an intra prediction mode. Various general methods may be employed as a method for determining a prediction block size of this embodiment. Furthermore, although the block size determination unit 108 is incorporated in the intra prediction mode determination apparatus 100 in this embodiment, a determination unit which is the same as the block size determination unit 108 may be implemented outside the intra prediction mode determination apparatus 100.

Figure 3:
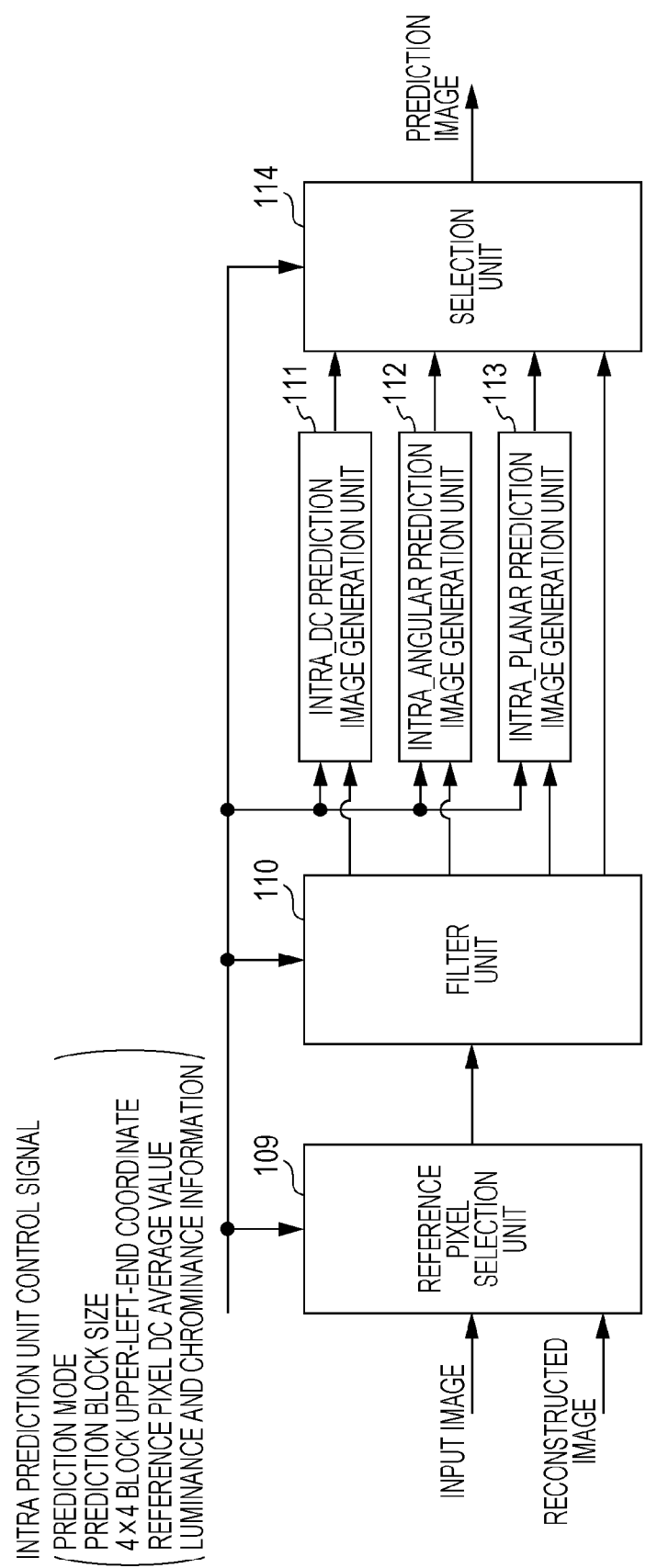
FIG. 3 is a block diagram illustrating a 4×4 intra prediction unit according to the first embodiment.

Next, the 4×4 intra prediction units 1 to k will be described with reference to FIG. 3. FIG. 3 is a diagram illustrating an internal configuration of the 4×4 intra prediction units 1 to k. Each of the 4×4 intra prediction units 1 to k includes a reference pixel selection unit 109, a filter unit 110, an Intra_DC prediction image generation unit 111, an Intra_Angular prediction image generation unit 112, an Intra_Planar prediction image generation unit 113, and a selection unit 114.

The reference pixel selection unit 109 inputs reference pixels of a prediction block of a processing target. Here, the reference pixel selection unit 109 of this embodiment uses one of the image input by the reading unit 104 and the reconstructed image stored in the reconstructed image storage unit 106. Then the reference pixel selection unit 109 selects pixels used for generating a prediction image corresponding to a prediction mode specified by the intra controller 107 from among the input reference pixels (or externally reads the pixels) and outputs the reference pixels to the filter unit 110. The filter unit 110 determines whether a filter process is to be performed on the reference pixels input by the reference pixel selection unit 109 on the basis of the specified prediction block size in accordance with the intra prediction unit control signal supplied from the intra controller 107. The filter unit 110 performs the filter process in accordance with Expressions 1 to 5 below. In Expressions 1 to 5, "p[x, y]" denotes the reference pixels which have not been subjected to the filter process and "fp[x, y]" denotes the reference pixels which have been subjected to the filter process. Furthermore, "nS" denotes the prediction block size, and nS is 8 in a case of an 8×8 block.

$$fp[-1, nS \times 2-1] = p[-1, nS \times 2-1] \quad \text{Expression 1}$$

$$fp[nS \times 2-1, -1] = p[nS \times 2-1, -1] \quad \text{Expression 2}$$

$$fp[-1, y] = (p[-1, y+1] + 2 \times p[-1, y] + p[-1, y-1] + 2) >> 2$$
$$(0 \leq y \leq nS \times 2-2) \quad \text{Expression 3}$$

$$fp[-1, -1] = (p[-1, 0] + 2 \times p[-1, -1] + p[0, -1] + 2) >> 2 \quad \text{Expression 4}$$

$$fp[x, -1] = (p[x-1, -1] + 2 \times p[x, -1] + p[x+1, -1] + 2) >> 2$$
$$(0 \leq x \leq nS \times 2-2) \quad \text{Expression 5}$$

Figure 4A:
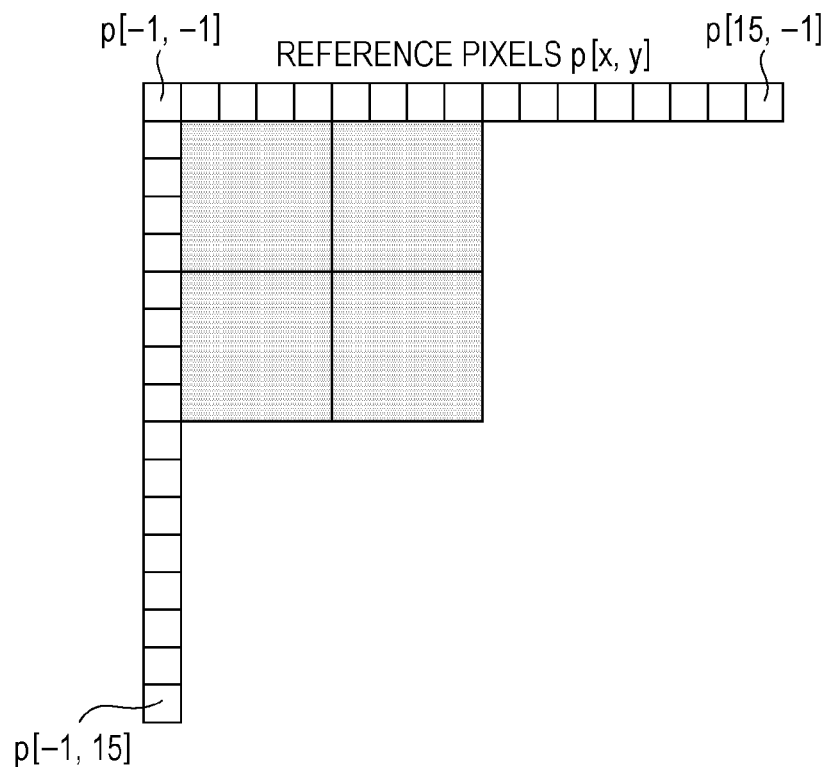
FIGS. 4A and 4B are diagrams illustrating correspondence of reference pixels in filtering.
Figure 4B:
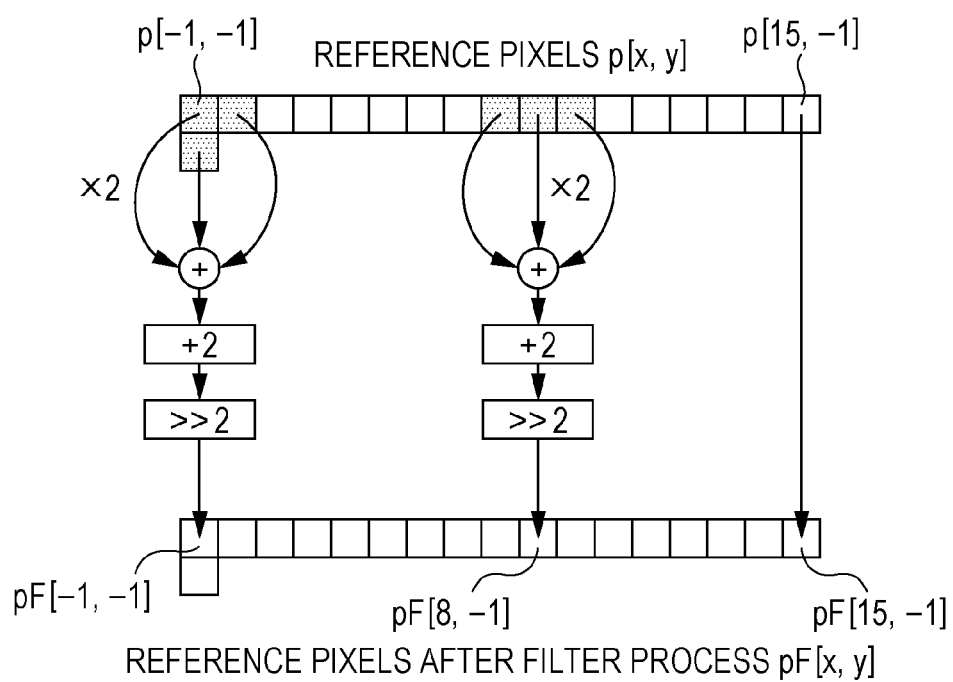

Here, the correspondence relationships of reference pixels in the filter process performed by the filter unit 110 will be described with reference to FIGS. 4A and 4B. In FIG. 4A, "p[x, y]" denotes reference pixels corresponding to the 8×8 block denoted by hatching. In FIG. 4B, correspondences between p[x, y] and pF[x, y] of some of the reference pixels of FIG. 4A is illustrated. In FIG. 4B, pF[−1, −1] is calculated using p[−1, −1], p[−1, 0], and p[0, −1]. Similarly, pF[8, −1] is calculated using p[7, −1], p[8, −1], and p[9, −1]. Furthermore, pF[15, −1] located at an end portion is not subjected to the filter process, and p[15, −1] is directly assigned. The other reference pixels are similarly subjected to the filter process in accordance with Expressions 1 to 5.

Furthermore, the filter unit 110 outputs the reference pixels which have been subjected to the filter process to the prediction image generation units 111 to 113 corresponding to specified prediction modes in accordance with the intra prediction unit control signal supplied from the intra controller 107.

When a prediction mode 0 (a Planar mode) is specified, the filter unit 110 inputs the reference pixels which have been subjected to the filter process to the Intra_Planar prediction image generation unit 113. The Intra_Planar prediction image generation unit 113 performs a process represented by Expression 6 so as to generate a Planar prediction image. In the expression below, "predSamples[x, y]" denotes pixel values of the prediction image.

$$\text{predSamples}[x,y] = ((nS-1-x) \times p[-1,y] + (x+1) \times p[nS,-1] + (nS-1-y) \times p[x,-1] + (y+1) \times p[-1,nS] + nS)) >> (k+1) \quad (0 \leq x \leq nS-1, 0 \leq y \leq nS-1, \text{ and } k \text{ is a logarithm of } nS \text{ in which a base of the logarithm is 2}) \quad \text{Expression 6}$$

When a prediction mode 1 (a vertical prediction mode) or a prediction mode 2 (a horizontal prediction mode) is specified, values of reference pixels located in vertically or horizontally adjacent positions are directly used as a prediction image. Therefore, the filter unit 110 directly outputs the reference pixels which have been subjected to the filter process to the selection unit 114.

When a prediction mode 3 (a DC prediction mode) is specified, the filter unit 110 inputs the reference pixels which have been subjected to the filter process to the Intra_DC prediction image generation unit 111. The Intra_DC prediction image generation unit 111 performs DC prediction so as to generate a prediction image. Here, in the DC prediction in the prediction mode 3, DC values of the reference pixels corresponding to a prediction block size are required to be calculated. The intra prediction mode determination apparatus 100 of this embodiment calculates and stores only DC values of reference pixels corresponding to the various prediction block sizes by a processor, not illustrated in FIG. 1, in parallel to a process of storing an input image to the input image storage unit 105. Furthermore, the DC values calculated and stored by the processor, not illustrated in FIG. 1, are directly input to the corresponding 4×4 intra prediction units 1 to k. The Intra_DC prediction image generation unit 111 performs a process represented by Expressions 7 to 10 or a process represented by Expression 11 in accordance with the DC values, luminance and chrominance information of a prediction block, and a prediction block size so as to perform the DC prediction. In Expressions 7 to 11, "DcVal" represents the DC values of the reference pixels.

$$\text{predSamples}[0,0] = (p[-1,0] + 2 \times DcVal + p[0,-1] + 2) >> 2 \quad \text{Expression 7}$$

$$\text{predSamples}[x,0] = (p[x,-1] + 3 \times DcVal + 2) >> 2$$
$$(1 \leq x \leq nS-1) \quad \text{Expression 8}$$

$$\text{predSamples}[0,y] = (p[-1,y] + 3 \times DcVal + 2) >> 2$$
$$(1 \leq y \leq nS-1) \quad \text{Expression 9}$$

$$\text{predSamples}[x,y] = DcVal \quad (1 \leq x \leq nS-1, 1 \leq y \leq nS-1) \quad \text{Expression 10}$$

$$\text{predSamples}[x,y] = DcVal \quad (0 \leq x \leq nS-1, 0 \leq y \leq nS-1) \quad \text{Expression 11}$$

Furthermore, when one of prediction modes 4 to 34 is specified, the filter unit 110 inputs the reference pixels which have been subjected to the filter process to the Intra_Angular prediction image generation unit 112. The Intra_Angular prediction image generation unit 112 performs angular prediction corresponding to the one of the prediction modes 4 to 34 so as to generate a prediction image.

In the prediction modes which perform the angular prediction (the prediction modes 4 to 34), since a prediction image generation method is commonly used by the prediction modes 4 to 34, the Intra_Angular prediction image generation unit 112 finally generates a prediction image using Expression 12 or Expression 13. Therefore, a single circuit may be shared by all processes of generating a prediction image in the prediction modes 4 to 34. Here, "refMain[x]" in Expressions 12 and 13 represents a variable used to temporarily store the reference pixels. Furthermore, "iFact" and "iIdx" represent variables uniquely determined on the basis of a prediction mode and a value of a y coordinate where a prediction pixel is located. The Intra_Angular prediction image generation unit 112 generates a prediction image using Expression 12 when a value of "iFact" is not 0, whereas the Intra_Angular prediction image generation unit 112 generates a prediction image using Expression 13 when the value of "iFact" is 0.

$$\text{predSamples}[x,y]=((32-i\text{Fact})\times\text{refMain}[x+i\text{Idx}+1]+ \\ i\text{Fact}\times\text{refMain}[x+i\text{Idx}+2]+16)>>5 (0 \leq x \leq nS-1, \\ 0 \leq y \leq nS-1) \quad \text{Expression 12}$$

$$\text{predSamples}[x,y]=\text{refMain}[x+i\text{Idx}+1] \ (0 \leq x \leq nS-1, \\ 0 \leq y \leq nS-1) \quad \text{Expression 13}$$

The selection unit 114 selects one of outputs from the prediction image generation units 111 to 113 which corresponds to a prediction mode specified by the intra prediction unit control signal supplied from the intra controller 107 and supplies the output to the correlation determination unit 102 as a prediction image.

Next, a process of performing intra prediction of an 8×8 block using the 4×4 intra prediction units 1 to k will be described with reference to FIGS. 5A to 5E. FIG. 5A is a diagram illustrating a process of intra prediction performed on a 4×4 block. In FIG. 5A, generation of a prediction image using reference pixels located in 45-degree upper right positions in angular prediction is illustrated. Here, coordinates in FIGS. 5A to 5E are represented as relative values obtained when a position of a pixel at an upper left end in a prediction target block is set as a starting point. Furthermore, in FIGS. 5B to 5E, an 8×8 intra prediction process in a prediction mode the same as that used in FIG. 5A is represented in a unit of 4×4 pixels.

FIG. 5B is a diagram illustrating a prediction process performed on a 4×4 pixel region in an upper left portion of an 8×8 block. The 4×4 intra prediction unit 1 (included in the intra prediction unit 101 of FIG. 1) generates predSamples [0, 0] to predSamples[3, 3] (a thick frame of FIG. 5B) using reference pixels p[1, −1] to p[7, −1] (a hatched portion in FIG. 5B). FIG. 5C is a diagram illustrating a prediction process performed on a 4×4 pixel region in an upper right portion of the 8×8 block. The 4×4 intra prediction unit 2 (included in the intra prediction unit 101 of FIG. 1) generates predSamples[4, 0] to predSamples[7, 3] (a thick frame of FIG. 5C) using reference pixels p[5, −1] to p[11, −1] (a hatched portion in FIG. 5C).

FIG. 5D is a diagram illustrating a prediction process performed on a 4×4 pixel region in a lower left portion of the 8×8 block. The 4×4 intra prediction unit 3 (included in the intra prediction unit 101 of FIG. 1) generates predSamples [0, 4] to predSamples[3, 7] (a thick frame of FIG. 5D) using reference pixels p[5, −1] to p[11, −1] (a hatched portion in FIG. 5D). FIG. 5E is a diagram illustrating a prediction process performed on a 4×4 pixel region in a lower right portion of the 8×8 block. The 4×4 intra prediction unit 4 (included in the intra prediction unit 101 of FIG. 1 but not illustrated) generates predSamples[4, 4] to predSamples[7, 7] (a thick frame of FIG. 5E) using reference pixels p[9, −1] to p[15, −1] (a hatched portion in FIG. 5E).

As is apparent from Expressions 12 and 13, the prediction processes in FIGS. 5B to 5E do not depend on one another, and therefore, the prediction processes may be independently performed. Accordingly, in this embodiment, first, a prediction mode, a prediction block size, luminance and chrominance information, and reference pixels (an address of p[−1, −1], for example) are commonly set to the four 4×4 intra prediction units (the 4×4 intra prediction units 1 to 4). Furthermore, by individually setting positional information (coordinates) of pixels in upper left ends of the 4×4 pixel regions to the 4×4 intra prediction units 1 to 4, intra prediction of the 8×8 block may be performed using the 4×4 intra prediction units 1 to 4 operated in parallel.

In this embodiment, although the intra prediction performed on the 8×8 block is illustrated in FIGS. 5B to 5E, the intra prediction process described above may be applicable to blocks larger than the 8×8 block as long as reference pixels and positional information on 4×4 pixel regions are appropriately set. Furthermore, it is apparent that this embodiment is applicable to prediction modes other than the prediction mode illustrated in FIGS. 5A and 5E (the angular prediction using the 45-degree upper right reference pixels).

Figure 6:
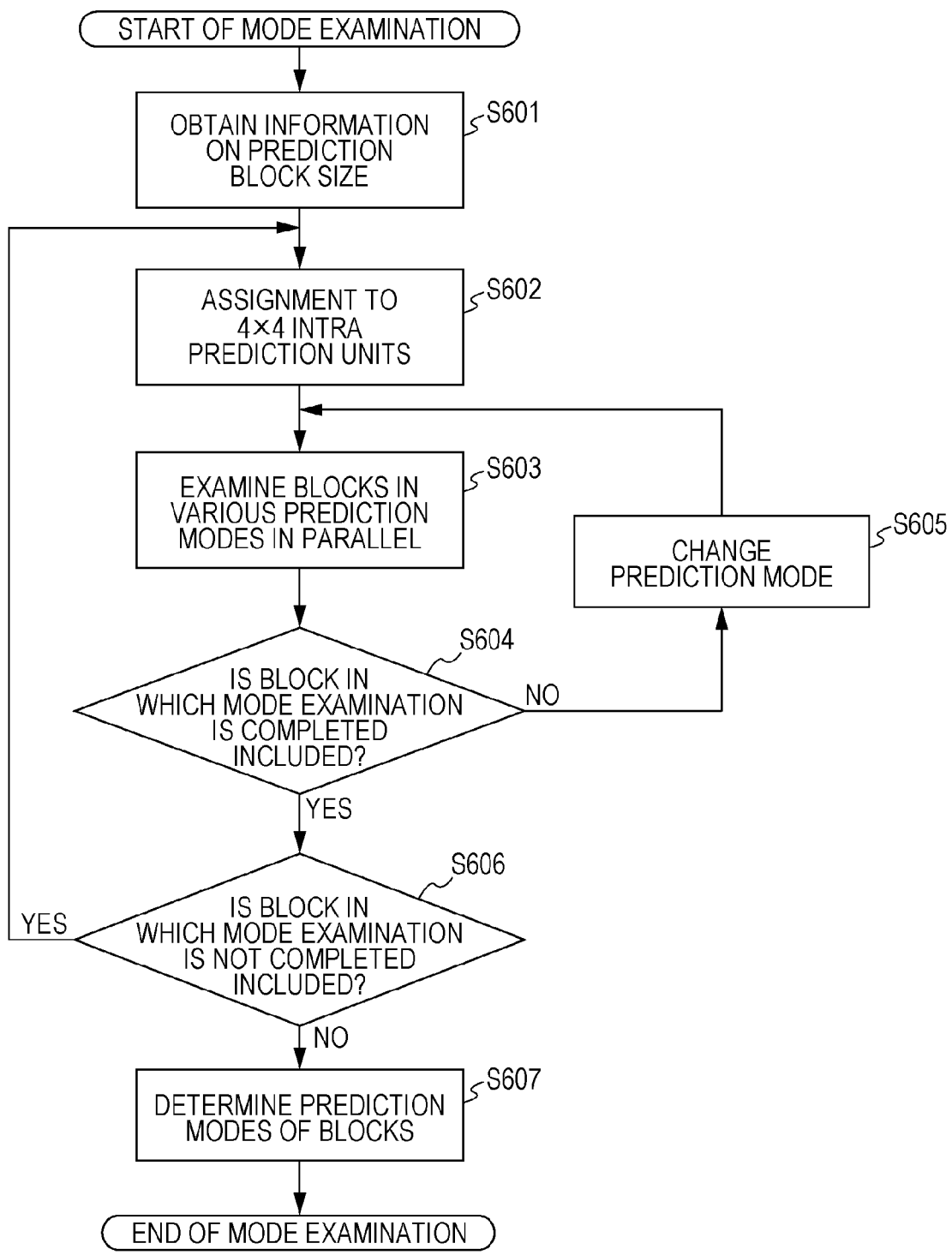
FIG. 6 is a flowchart illustrating a processing flow of an intra prediction mode determination apparatus according to the first embodiment.

Next, a processing flow of the intra prediction mode determination apparatus 100 of this embodiment will be described with reference to FIG. 6. After a prediction mode examination is started, the intra controller 107 obtains information on a prediction block size determined by the block size determination unit 108 (step S601). Subsequently, the intra controller 107 assigns prediction blocks of processing targets to the 4×4 intra prediction units 1 to k included in the intra prediction unit 101 in accordance with the information on the prediction block size obtained in step S601 (step S602). As a method for assigning the prediction blocks of the processing targets to the 4×4 intra prediction units 1 to k in step S602, a look-up table provided in advance may be referred to. However, this embodiment is not limited to this and various methods may be employed. Specifically, an assignment algorithm may be loaded in an incorporated CPU (a processor not illustrated in FIG. 2) in advance and the intra controller 107 may assign prediction blocks of the processing targets to the 4×4 intra prediction units 1 to k in accordance with the algorithm.

After assignment of the prediction blocks of the processing targets to the 4×4 intra prediction units 1 to k is completed in step S602, the intra prediction unit 101 and the correlation determination unit 102 execute examinations of the prediction blocks of the processing targets in various prediction modes in parallel (step S603). The process of step S603 includes a filter process performed on the reference pixels as described above, the prediction image generation process, and the SAD calculation process. Thereafter, the intra prediction mode determination apparatus 100 determines whether a prediction block in which the prediction mode examination is completed (a prediction block in which examinations in all prediction mode candidates are terminated) is included in an encoding block of a processing target (step S604).

When it is determined that a prediction block in which the prediction mode examination is completed is not included in step S604 (NO in step S604), the intra prediction mode determination apparatus 100 changes a prediction mode and continues the examination (step S605). On the other hand, when it is determined that a prediction block in which the prediction mode examination is completed is included in the prediction blocks in step S604 (the block is referred to as a "prediction block A", for example) (YES in step S604), the intra prediction mode determination apparatus 100 performs the following process. Specifically, the intra prediction mode determination apparatus 100 further determines whether at least one of the prediction blocks in which the prediction mode examination is not completed is included (step S606).

When it is determined that at least one of the prediction blocks in which the prediction mode examination is not completed is included in step S606 (YES in step S606), the intra controller 107 reassigns one of the 4×4 intra prediction units 1 to k to which the prediction block A has been assigned to another prediction block (step S602). Then the intra prediction mode determination apparatus 100 continues the prediction mode examination process. On the other hand, when it is determined that the prediction mode examinations of all the prediction blocks are completed in step S606 (NO in step S606), the entire prediction mode examination process performed on all the prediction blocks of the encoding block of the processing target is terminated. Therefore, the intra prediction mode determination apparatus 100 determines a prediction mode corresponding to the smallest SAD for each prediction block (step S607), and the prediction mode examination is terminated.

Figure 7:
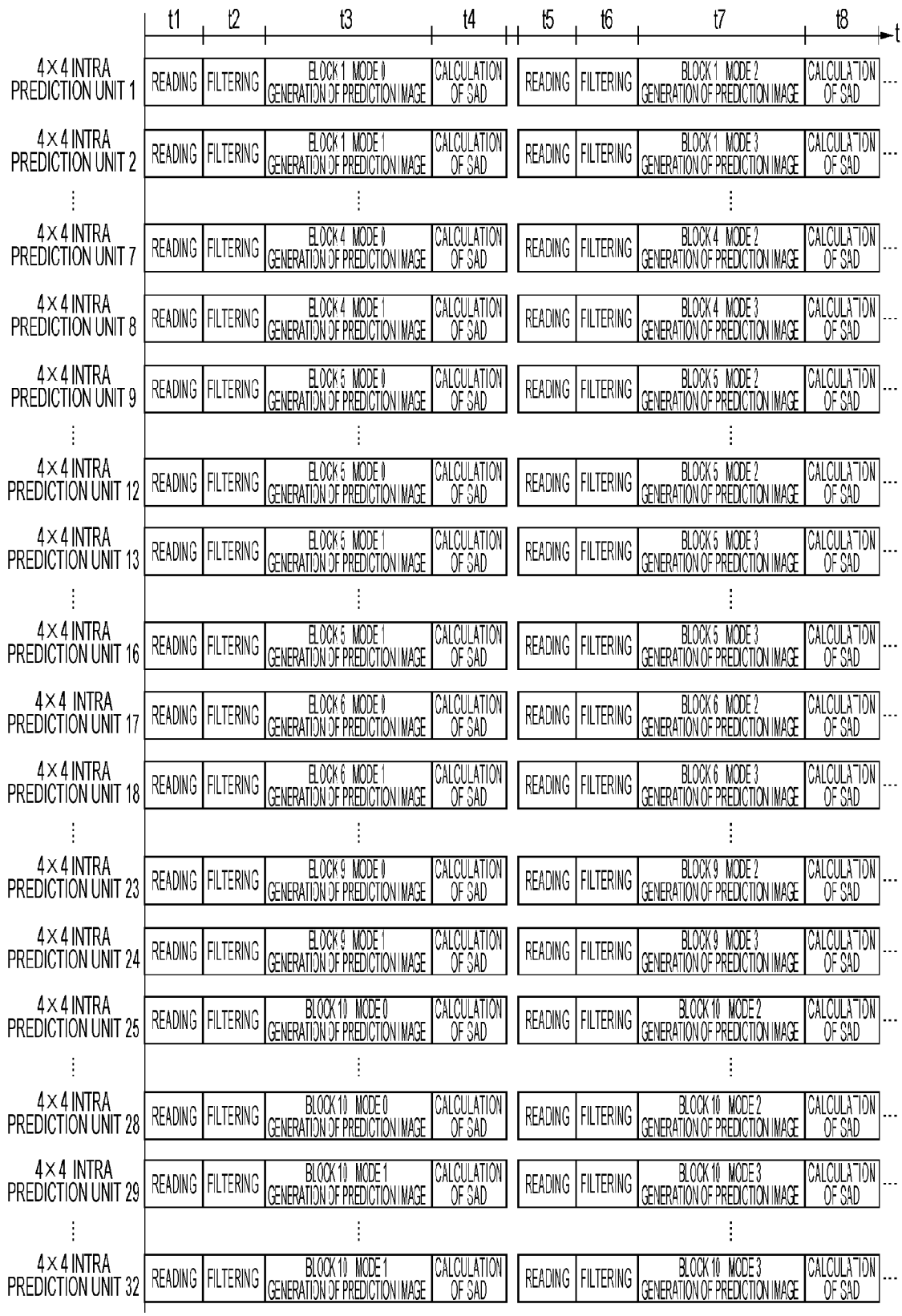
FIG. 7 is a timing chart illustrating the processing flow according to the first embodiment.

Next, the process performed by the intra prediction unit 101 and the correlation determination unit 102 in step S603 of FIG. 6 will be described with reference to a timing chart of FIG. 7. In FIG. 7, an axis of abscissa t represents a time axis of the process. The terms "4×4 intra prediction units 1 to 32" described on a leftmost portion of FIG. 7 represent the 4×4 intra prediction units 1 to 32 used for the prediction image generation of the prediction blocks of processing targets.

Figure 8:
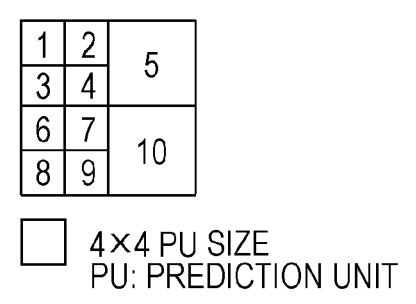

For simplicity of description, it is assumed that the intra prediction unit 101 of FIG. 1 includes the 4×4 intra prediction units 1 to 32 (k=32) and an input image is used as reference pixels in FIG. 7. Furthermore, it is assumed that information on a prediction block size illustrated in FIG. 8 is obtained in step S601 of FIG. 6, and scheduling and assignment of prediction blocks are performed on the 4×4 intra prediction units 1 to 32 as illustrated in FIG. 9A in step S602. In FIG. 9A, two prediction modes are assigned to each of prediction blocks 1 to 10 irrespective of a prediction block size so that each of the prediction blocks 1 to 10 are examined in the two modes. Similarly, in the other 4×4 intra prediction units, a prediction image is generated for a 4×4 pixel region of a 4×4 block or prediction images are generated for 4×4 pixel regions of an 8×8 block.

Specifically, the 4×4 intra prediction unit 1 generates a prediction image of the prediction block 1 (a 4×4 block) in the prediction mode 0, and the 4×4 intra prediction unit 2 generates a prediction image of the prediction block 1 in the prediction mode 1. Furthermore, each of the 4×4 intra prediction units 9 to 12 generates prediction images of four 4×4 pixel regions included in the prediction block 5 (an 8×8 block) in the prediction mode 0. Here, a block size of the prediction block 5 (the 8×8 block) is four times as large as a block size of the prediction block 1 (the 4×4 block). Therefore, in this embodiment, the number of 4×4 intra prediction units which perform a process of generating a prediction image on the prediction block 5 is four times as large as the number of 4×4 intra prediction units which perform a process of generating a prediction image on the prediction block 1. In other words, the prediction image of the prediction block 1 (the 4×4 block) is generated in the prediction mode 0 using the single 4×4 prediction unit whereas the prediction image of the prediction block 5 (the 8×8 block) is generated in the prediction mode 0 using four 4×4 intra prediction units.

That is, in a case where a plurality of prediction block sizes are included in an image and a second prediction block size (8×8 pixels, for example) is a predetermined times (four times) as large as a first prediction block size (4×4 pixels, for example), the number of intra prediction units is determined as described below. Specifically, in this embodiment, the number of intra prediction units which generate respective prediction images of a second block having the second prediction block size is the predetermined times as large as the number of intra prediction units which generate respective prediction images of a first block having the first prediction block size.

At t1 of FIG. 7, the 4×4 intra prediction units 1 to 32 read reference pixels of respective blocks of processing targets which have been assigned thereto through the reading unit 104. Specifically, the 4×4 intra prediction unit 1 obtains reference pixels required for prediction of the prediction block 1 and the 4×4 intra prediction unit 9 obtains reference pixels required for prediction of a 4×4 pixel region in an upper left portion of the prediction block 5. The other 4×4 intra prediction units also perform the same process.

At t2, the 4×4 intra prediction units 1 to 32 perform a filter process on the reference pixels (an input image) obtained at t1. Specifically, the 4×4 intra prediction unit 1 performs the filter process on the reference pixels corresponding to the prediction block 1, and the 4×4 intra prediction unit 9 performs the filter process on the reference pixels corresponding to the 4×4 pixel region in the upper left portion of the prediction block 5. The other 4×4 intra prediction units also perform the same process.

At t3, the 4×4 intra prediction units 1 to 32 generate prediction images of the 4×4 block size in accordance with the prediction modes individually assigned to the 4×4 intra prediction units 1 to 32 using the reference pixels which have been subjected to the filter process performed at t2. Specifically, the 4×4 intra prediction unit 1 generates a prediction image of the prediction block 1 in the prediction mode 0, and the 4×4 intra prediction unit 9 generates a prediction image of the 4×4 pixel region in the upper left portion of the prediction block 5 in the prediction mode 0.

SAD calculation at t4 is performed by the correlation determination unit 102. The correlation determination unit 102 calculates SADs between the input image and the prediction images generated by the 4×4 intra prediction units 1 to 32 and outputs results of the calculation to the prediction mode determination unit 103.

As described above, the prediction blocks are examined in the prediction modes 0 and 1 by the process from t1 to t4. Thereafter, through the process from step S604 and step S605, as with the process from t1 to t4, the prediction blocks are examined in the prediction modes 2 and 3 in a process from t5 to t8. Thereafter, the prediction blocks are similarly examined in the other prediction modes. As described above, when the numbers of prediction modes for the examinations of the prediction blocks are different from one another, a 4×4 intra prediction unit which has been assigned to a prediction block in which the prediction mode examination is terminated may be used for the prediction mode examination of another prediction block which has not been subjected to the prediction mode examination. That is, rescheduling may be performed.

Figure 10:
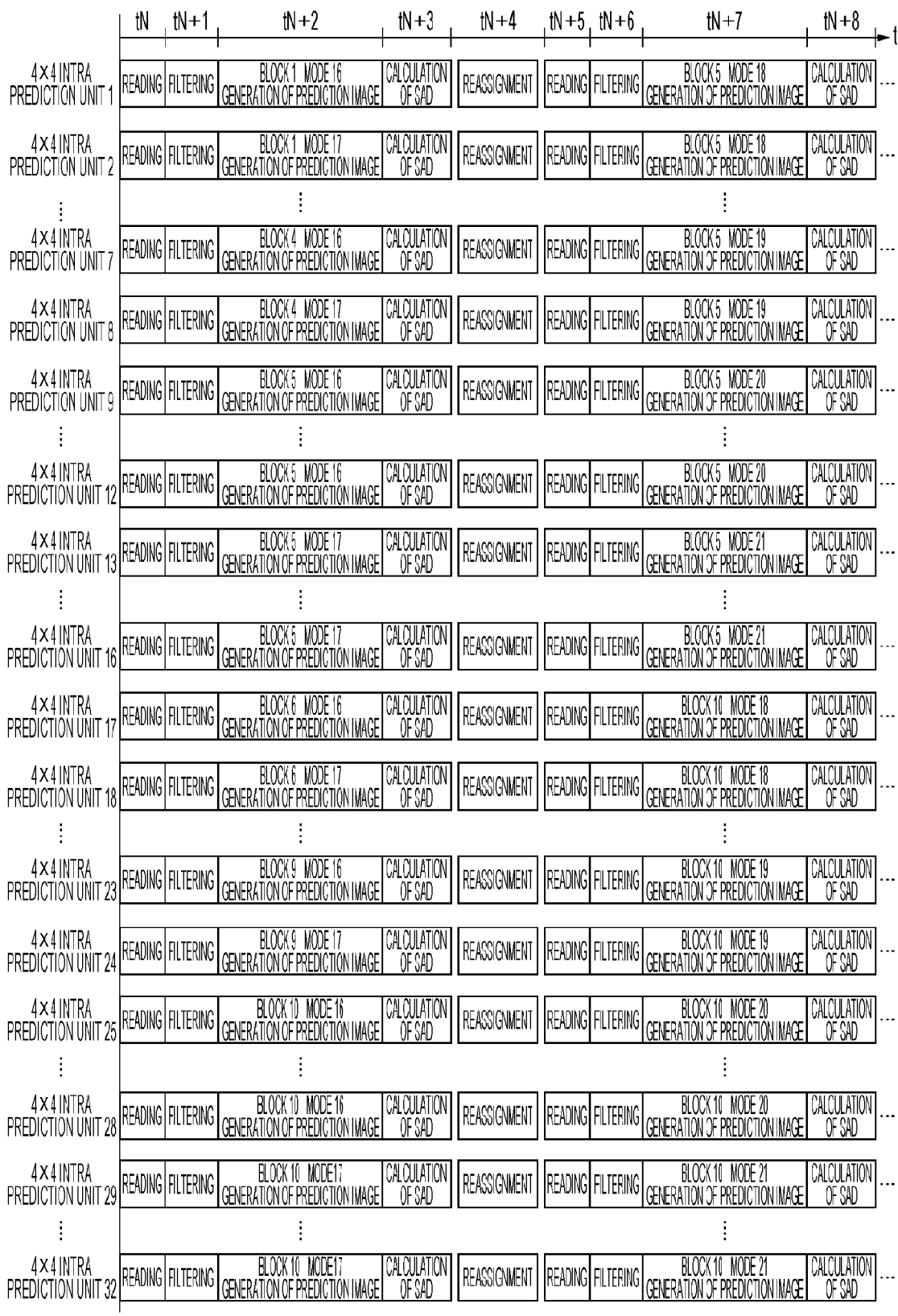
FIG. 10 is a timing chart illustrating a process of reassigning the blocks of the processing targets to the 4×4 intra prediction units according to the first embodiment.

FIG. 10 is a timing chart when the rescheduling is performed. By a process from tN to tN+3 in FIG. 10, examinations of the prediction blocks 1 to 10 in the prediction modes 16 and 17 are terminated. The process from tN to tN+3 is the same as the process of FIG. 7, and a description thereof is omitted.

Assuming that the number of prediction modes of a 4×4 block in intra prediction of a high efficiency video coding method (hereinafter referred to as "HEVC") is 18 (refer to FIG. 20A), examinations of the prediction blocks 1 to 4 and the prediction blocks 6 to 9 in all the prediction modes are completed at tN+3. On the other hand, the prediction blocks 5 and 10 are 8×8 blocks and have 35 prediction modes, and therefore, examinations in the prediction modes are not completed at tN+3. Therefore, eight 4×4 intra prediction units which have been assigned to the prediction blocks 1 to 4 and the prediction blocks 6 to 9 are reassigned to the prediction blocks 5 and 10. By this, the surplus calculation resources may be effectively used (refer to the operations in step S604, step S606, and step S602 of FIG. 6).

At tN+4, the intra controller 107 performs a reassignment process. By this process, the 4×4 intra prediction units 1 to 8 and the 4×4 intra prediction units 17 to 24 assigned to the prediction blocks 1 to 4 and the prediction blocks 6 to 9, respectively, are assigned to target 4×4 pixel regions of the prediction blocks 5 and 10. The reassignment is performed in accordance with the intra prediction unit control signal. Reassignment of the prediction blocks to the 4×4 intra prediction units 1 to 32 is illustrated in FIG. 9B.

After the reassignment is completed at tN+4, examinations of the prediction blocks 5 and 10 in the remaining prediction modes (the prediction modes 18 to 35) are subsequently performed using the 4×4 intra prediction units 1 to 32 in a process from tN+5. For example, the 4×4 intra prediction unit 1 is used to generate a prediction image of a 4×4 pixel region in an upper left portion of the prediction block 5 after tN+5.

As described above, in this embodiment, a prediction block having a size larger than that of the 4×4 block is examined in intra prediction modes by assigning the 4×4 intra prediction units 1 to k to a plurality of prediction blocks having different sizes. By this, since calculation units are not required to be individually provided for the prediction modes and the prediction block sizes, a circuit size may be reduced. In addition, as described above, the method for generating a prediction image in the Intra_Angular prediction which occupies most of the intra prediction modes is shared in the HEVC. Therefore, since a configuration of a 4×4 intra prediction unit may be shared a plurality of prediction mode candidates, increase of a circuit size may be suppressed when compared with a case where the calculation units are provided for individual prediction mode candidates.

Furthermore, in this embodiment, each of the prediction blocks is examined in a plurality of prediction modes in parallel in accordance with resource amounts of the 4×4 intra prediction units 1 to k included in the intra prediction unit 101. Furthermore, a plurality of prediction blocks having different prediction block sizes are also examined in a plurality of prediction modes in parallel. Therefore, in an encoding method in which a single encoding block is particularly predictable using a plurality of prediction block sizes, the calculation unit may be efficiently used, and reduction of a circuit size and improvement of processing performance may be both attained.

In the timing charts (FIGS. 7 and 10) of this embodiment, all the processes of generating prediction images of the 4×4 intra prediction units 1 to k are simultaneously terminated and all the SAD calculation processes of the 4×4 intra prediction units 1 to k are simultaneously terminated. However, it is not necessarily the case that the processes are simultaneously terminated. Specifically, when the 4×4 intra prediction units 1 to k are configured to output a flag (information) representing an end of the process and the flag is examined, this embodiment is applicable even in a case where examinations in the various prediction modes are not simultaneously terminated. Furthermore, the configuration described above may be applied only to some prediction modes (only to the Intra_Angular mode, the horizontal prediction mode, and the vertical prediction mode, for example) and independent circuits may be provided for the other prediction modes.

Furthermore, periods of time required for generating prediction images may be further reduced by omitting the filter process to be performed on the reference pixels in the 4×4 intra prediction units 1 to k. Furthermore, the assignment of the prediction blocks to the 4×4 intra prediction units 1 to k may be realized by a method for providing a number of predetermined assignment patterns in a table and performing switching among the patterns. By this, the configuration of the intra controller 107 may be simplified and the process may be performed at higher speed.

Second Embodiment

Figure 11:
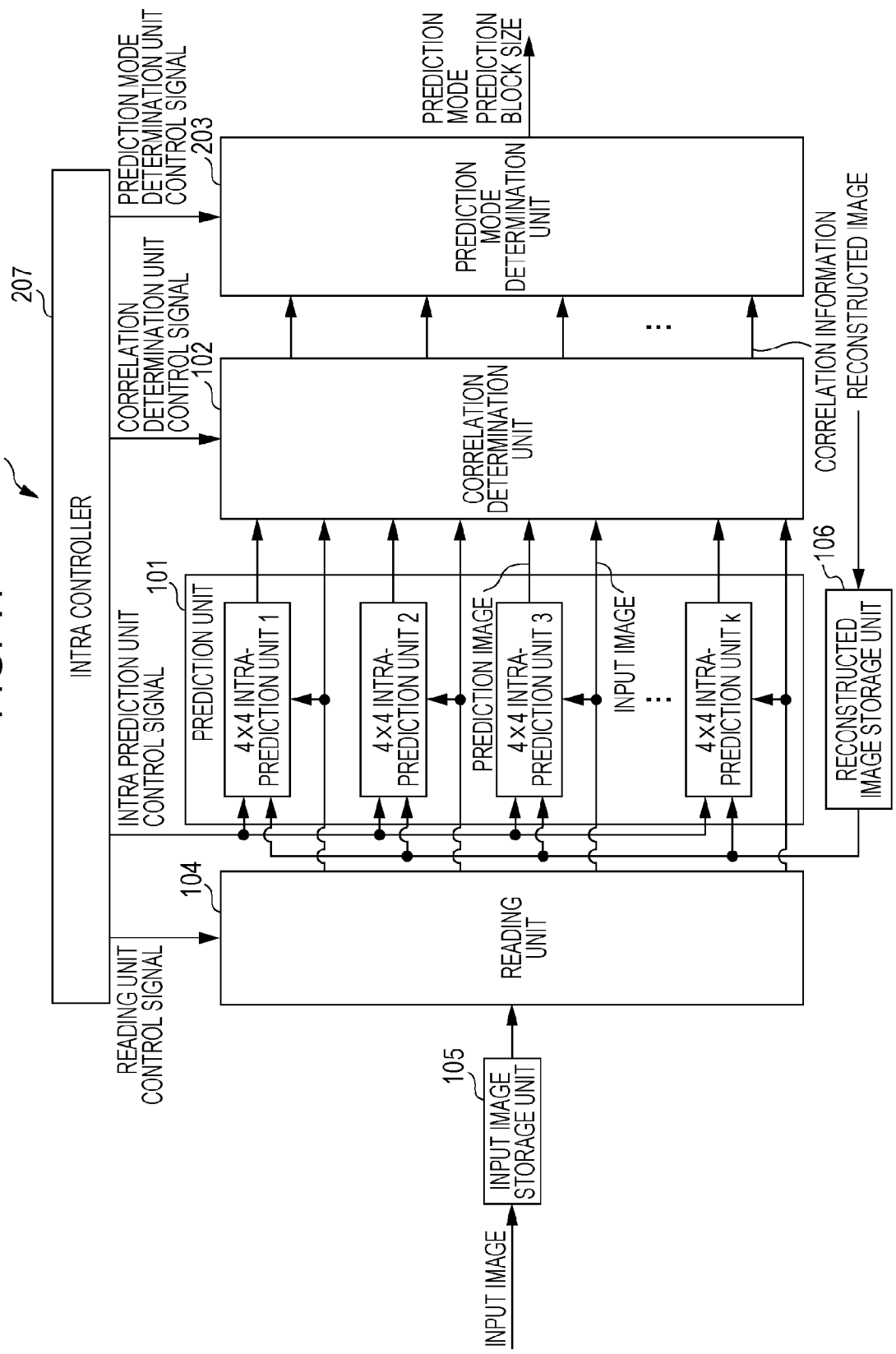
FIG. 11 is a block diagram illustrating an intra prediction mode determination apparatus according to a second embodiment.

FIG. 11 is a block diagram illustrating an intra prediction mode determination apparatus 100 according to a second embodiment. The intra prediction mode determination apparatus 100 of this embodiment does not include the block size determination unit 108 (refer to FIG. 1) included in the intra prediction mode determination apparatus 100 of the first embodiment. In FIG. 11, components other than a prediction mode determination unit 203 and an intra controller 207 have functions the same as those of the intra prediction mode determination apparatus 100 of the first embodiment (FIG. 1) described above, and therefore, the same reference numerals are used and descriptions thereof are appropriately omitted. In the first embodiment, the intra controller 107 uniquely determines a prediction block size in accordance with the prediction block size information input from the block size determination unit 108. On the other hand, in this embodiment, the intra controller 207 generates prediction block size information of all possible prediction block sizes serving as candidates in intra prediction without obtaining the prediction block size information so as to perform examinations in all prediction mode candidates.

The intra controller 207 generates a control signal used to perform examinations in all prediction modes for each possible prediction block size, and outputs the control signal to an intra prediction unit 101, a correlation determination unit 102, the prediction mode determination unit 203, and a reading unit 104.

The prediction mode determination unit 203 finally determines a prediction block size for intra prediction and a prediction mode thereof in accordance with a prediction mode determination control signal supplied from the intra controller 207 and correlation information supplied from the correlation determination unit 102. As with the first embodiment, correlation information supplied from the correlation determination unit 102 is SADs between input images of various block sizes and prediction images in various prediction modes.

FIG. 12 is a processing flow of the intra prediction mode determination apparatus 100 according to the second embodiment. After a prediction mode examination is started, the intra controller 207 determines possible prediction block sizes so as to determine candidates for the prediction mode examination (step S1201). Specifically, when the maximum prediction block size is a 16×16 block, the intra controller 207 determines prediction block sizes of 16×16 (FIG. 13A), 8×8 (FIG. 13B), and 4×4 (FIG. 13C) as candidates for the prediction mode examination. Subsequently, the intra controller 207 assigns prediction blocks of processing targets to the 4×4 intra prediction units 1 to k included in the intra prediction unit 101 in accordance with the information on the prediction block size for the prediction mode examination obtained in step S1201 (S1202).

After the assignment of the prediction blocks of the processing targets to the 4×4 intra prediction units 1 to k is completed in step S1202, the intra prediction unit 101 and the correlation determination unit 102 perform examinations of the prediction blocks of the processing targets in various prediction modes in parallel (step S1203 to step S1205). The process from step S1203 to step S1205 includes a filter process performed on reference pixels, a prediction image generation process, and a SAD calculation process. Thereafter, the intra prediction mode determination apparatus 100 determines whether a prediction block in which the prediction mode examination is completed is included in an encoding block of a processing target (step S1206).

When it is determined that a prediction block in which the prediction mode examination is completed is not included in step S1206 (NO in step S1206), the intra prediction mode determination apparatus 100 changes a prediction mode and continues the examination (step S1207). On the other hand, when it is determined that a prediction block in which the prediction mode examination is completed is included in the prediction blocks in step S1206 (the block is referred to as a "prediction block A", for example) (YES in step S1206), the intra prediction mode determination apparatus 100 performs the following process. Specifically, the intra prediction mode determination apparatus 100 further determines whether at least one of the prediction blocks in which the prediction mode examination is not completed is included (step S1208).

When it is determined that at least one of the prediction blocks in which the prediction mode examination is not completed is included in step S1208 (YES in step S1208), the intra controller 207 reassigns one of the 4×4 intra prediction units 1 to k to which the prediction block A has been assigned to another prediction block (step S1202). Thereafter, the intra prediction mode determination apparatus 100 continues the prediction mode examination process. On the other hand, when all the prediction blocks have been subjected to the prediction mode examination in step S1208 (NO in step S1208), the prediction mode examination process has been performed on all the prediction block sizes determined as the examination candidates in step S1201. Specifically, SADs have been individually obtained from the prediction blocks 1 to 21 of FIGS. 13A to 13C. Therefore, the intra prediction mode determination apparatus 100 determines a prediction block size having the smallest SAD and a prediction mode thereof from among the candidates of possible prediction block sizes (step S1209), and then the mode examination is terminated.

Next, assignment of prediction blocks of processing targets to the 4×4 intra prediction units 1 to k in a case where k is 32 in FIG. 11 and a prediction mode examination is performed on the prediction block size candidates illustrated in FIGS. 13A to 13C is illustrated in FIG. 14. In FIG. 14, the prediction block 1 (16×16), the prediction block 2 (8×8), and the prediction block 6 (4×4) are assigned to the 4×4 intra prediction units 1 to k such that the 4×4 intra prediction units 1 to k may perform prediction mode examinations in parallel. Specifically, the 4×4 intra prediction units 1 to 16 generate respective prediction images of 16 4×4 pixel regions included in the prediction block 1 in the prediction mode 0. Furthermore, the 4×4 intra prediction units 17 to 20 generate respective prediction images of four 4×4 pixel regions included in the prediction block 2 in the prediction mode 0. The other 4×4 intra prediction units 21 to 32 similarly generate respective prediction images.

A timing chart of the intra prediction unit 101 and the correlation determination unit 102 are the same as that of FIG. 7 of the first embodiment, and therefore, is omitted.

Accordingly, in this embodiment, even when an appropriate prediction block size is not recognized, each of the prediction blocks may be examined in a plurality of prediction modes in parallel in accordance with resource amounts of the 4×4 intra prediction units 1 to k included in the intra prediction unit 101. Furthermore, a plurality of prediction blocks having different prediction block sizes may also be examined in various prediction modes in parallel.

Third Embodiment

Figure 15:
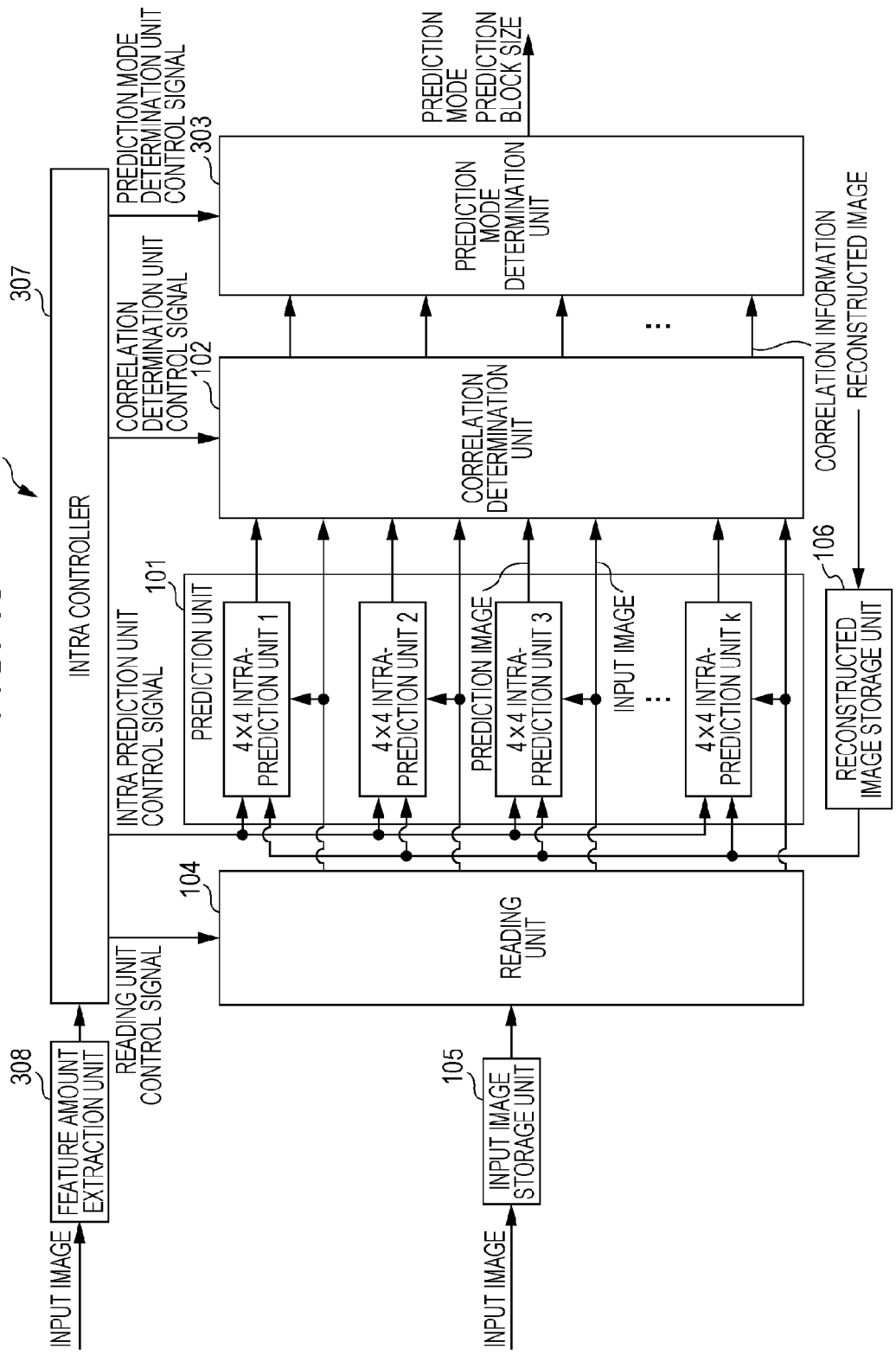
FIG. 15 is a block diagram illustrating an intra prediction mode determination apparatus according to a third embodiment.

FIG. 15 is a block diagram illustrating an intra prediction mode determination apparatus 100 according to a third embodiment. The intra prediction mode determination apparatus 100 of this embodiment includes a feature amount extraction unit 308 instead of the block size determination unit 108 included in the intra prediction mode determination apparatus 100 of the first embodiment. In FIG. 15, components other than a prediction mode determination unit 303, an intra controller 307, and the feature amount extraction unit 308 have configurations the same as those of the intra prediction mode determination apparatus 100 of the first embodiment (FIG. 1) described above, and therefore, the same reference numerals are used and descriptions thereof are appropriately omitted.

In the first embodiment, the intra controller 107 uniquely determines a prediction block size in accordance with the prediction block size information input from the block size determination unit 108. However, as with the second embodiment, the intra controller 307 does not obtain information on a prediction block size in this embodiment. Furthermore, the intra controller 207 according to the second embodiment generates the information on a prediction block size using all the possible prediction block sizes in the intra prediction as the candidates so as to perform the prediction mode examination process. On the other hand, the intra controller 307 of this embodiment performs a prediction mode examination process on a prediction block size selected from among candidates of all possible prediction block sizes in intra prediction in accordance with a feature amount extracted from an input image.

The feature amount extraction unit 308 extracts a feature amount of an image input to the intra prediction mode determination apparatus 100. In this embodiment, the feature amount extraction unit 308 calculates a complexity degree as the feature amount of the input image. Then the feature amount extraction unit 308 selects a candidate of a prediction block size for performing a prediction mode examination from among all possible prediction block sizes in the intra prediction in accordance with the complexity degree and transmits the selected prediction block size to the intra controller 307. In this way, at least one prediction block size for the prediction mode examination may be selected (extracted) from among candidates of all the possible prediction blocks in the intra prediction in accordance with the feature amount so that the number of candidates of a prediction block size for the prediction mode examination may be reduced. Accordingly, when compared with the case where the prediction mode examination is performed on all candidates of a prediction block size, an amount of calculation process in the prediction mode examination performed by the intra prediction mode determination apparatus 100 may be suppressed.

As an index value of the complexity degree, a total value of differences between values of pixels included in a prediction block and an average value of pixels in the prediction block may be used. However, this embodiment is not limited to this. Furthermore, although the complexity degree is used as the feature amount of the input image in this embodiment, this embodiment is not limited to this, and any value may be used as the feature amount as long as the value is based on at least one of a complexity degree, activity, an edge, and a pixel average value of an input image. Furthermore, since the image input to an input image storage unit 105 is also input to the feature amount extraction unit 308, the feature amount extraction unit 308 may extract a feature amount before start of a prediction mode examination.

The intra controller 307 generates information on a prediction block size in accordance with the candidate of a prediction block size selected by the feature amount extraction unit 308 and generates control signals used to perform a prediction mode examination in accordance with the information on a prediction block size. Then the intra controller 307 outputs the generated control signals to the intra prediction unit 101, the correlation determination unit 102, the prediction mode determination unit 303, and the reading unit 104.

Figure 16:
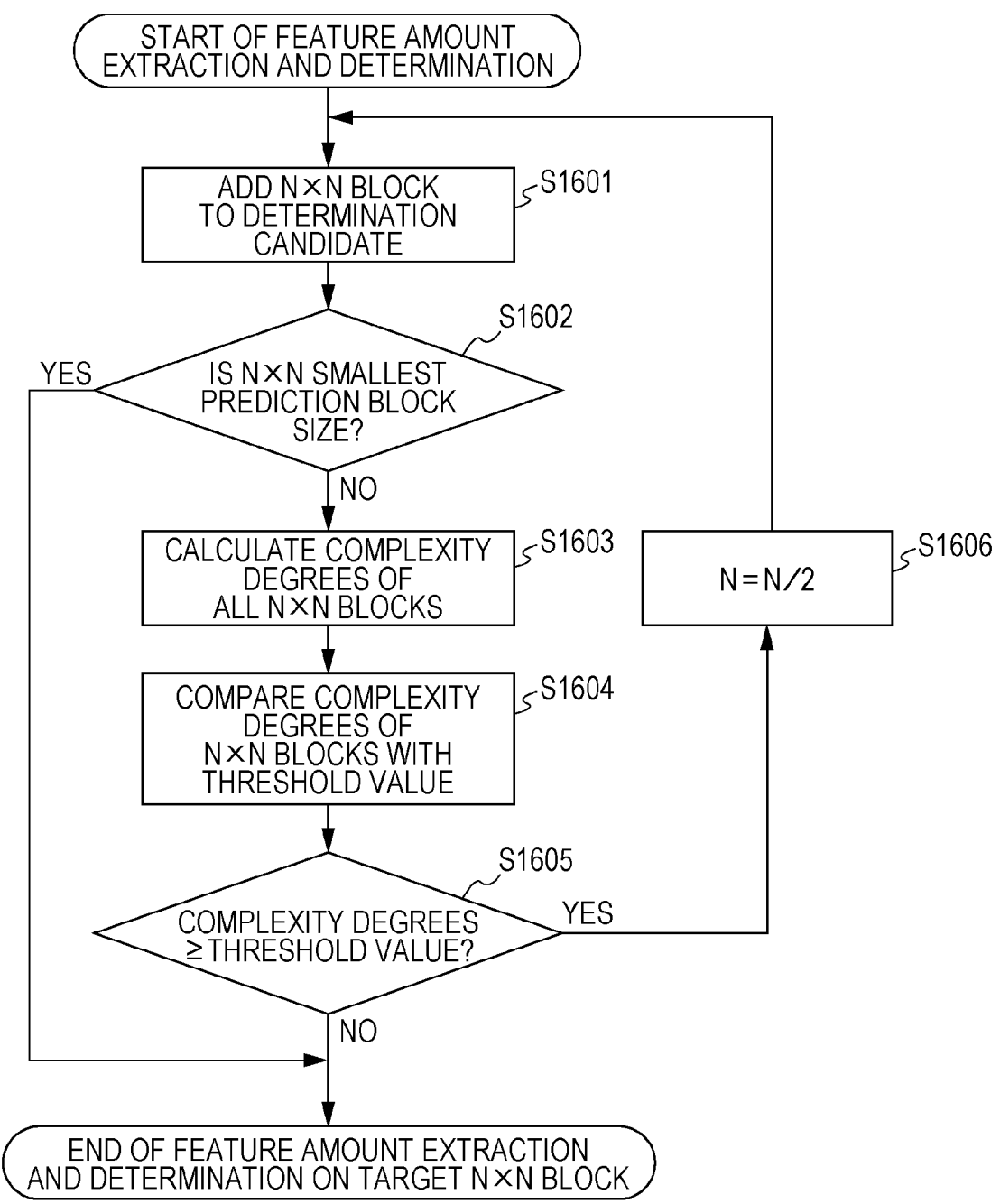
FIG. 16 is a flowchart illustrating a processing flow of selection of a candidate of a prediction block size according to the third embodiment.
Figure 17A:
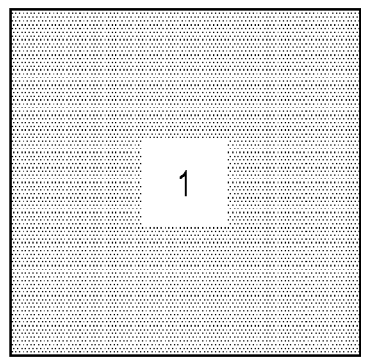
FIGS. 17A to 17D are diagrams illustrating results of selection of a candidate of a prediction block size of a 32×32 block.
Figure 17B:
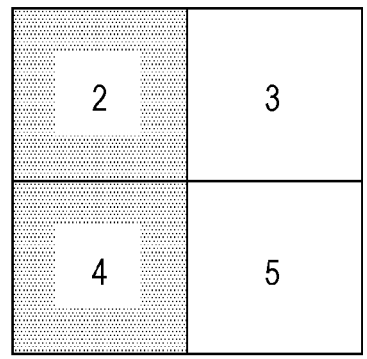
Figure 17C:
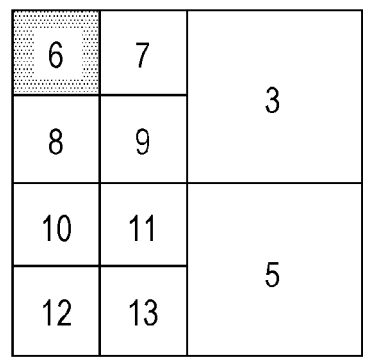
Figure 17D:
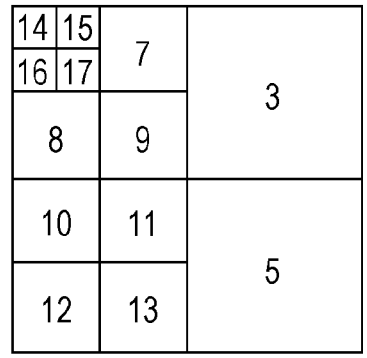

FIG. 16 is a flowchart illustrating a feature amount extraction process and a process of selecting a candidate of a prediction block size in accordance with a result of the feature amount extraction. Hereinafter, the process of selecting a prediction block size of an encoding block (32×32) illustrated in FIGS. 17A to 17D will be described with reference to FIG. 16. For simplicity of the description, it is assumed that complexity degrees of hatched blocks in FIGS. 17A to 17C exceed a predetermined threshold value.

Extraction of Feature Amount of 32×32 Block

The intra prediction mode determination apparatus 100 adds a 32×32 block as a candidate of a prediction block size for a prediction mode examination (step S1601). Subsequently, the feature amount extraction unit 308 determines whether the 32×32 block added in step S1601 is the smallest prediction block size in an encoding block of a processing target (step S1602). When it is determined that the 32×32 block is not the smallest prediction block size in step S1602 (NO in step S1602), the feature amount extraction unit 308 calculates a complexity degree of the 32×32 block (step S1603). Then the complexity degree calculated in step S1603 and the predetermined threshold value are compared with each other (step S1604) so that it is determined whether the complexity degree is equal to or larger than the threshold value (step S1605).

When it is determined that the complexity degree is equal to or larger than the threshold value in step S1605 (YES in step S1605), the feature amount extraction unit 308 divides pixels in a horizontal direction and pixels in a vertical direction in the 32×32 block in half (that is, divides the 32×32 block in quarters) (step S1606). Then the feature amount extraction unit 308 continuously performs the feature amount extraction and the process of selecting a prediction block size for the prediction mode examination on 16×16 blocks generated in step S1606. On the other hand, when it is determined that the complexity degree is smaller than the threshold value in step S1605 (NO in step S1605), the feature amount extraction unit 308 determines that the 32×32 block is a simple image (an uncomplicated image) and only selects the 32×32 block as the prediction block size for the prediction mode examination. Here, the 32×32 prediction block 1 illustrated in FIG. 17A has a complexity degree equal to or larger than the threshold value, and therefore, the feature amount extraction unit 308 continuously performs the process on four 16×16 blocks obtained by dividing the 32×32 prediction block in quarters.

Extraction of Feature Amount of 16×16 Block

An examination process the same as that performed on the 32×32 block (step S1601 and step S1602) described above is performed. When it is determined that the 16×16 block is not the smallest prediction block size in step S1602 (NO in step S1602), the feature amount extraction unit 308 performs a process in step S1603. In step S1603, the feature amount extraction unit 308 calculates complexity degrees of the 16×16 blocks (16×16 blocks 2 to 5 illustrated in FIG. 17B) added as a candidate of a prediction block size for the prediction mode examination in step S1601. Then the feature amount extraction unit 308 compares the complexity degrees calculated in step S1603 and the predetermined threshold value with each other (step S1604) so that it is determined whether the complexity degrees of the 16×16 blocks 2 to 5 are equal to or larger than the threshold value (step S1605).

A process to be performed when it is determined that the complexity degrees are equal to or larger than the threshold value in step S1605 (YES in step S1605) and a process to be performed when it is determined that the complexity degrees are smaller than the threshold value (NO in step S1605) are the same as the processes in the feature amount extraction flow of the 32×32 block described above. Here, since the 16×16 blocks 2 and 4 illustrated in FIG. 17B have the complexity degrees equal to or larger than the threshold value, the feature amount extraction unit 308 divides each of the 16×16 blocks 2 and 4 in quarters so as to generate 8×8 blocks (step S1606). Then the feature amount extraction unit 308 continuously performs the feature amount extraction and the process of selecting a prediction block size for the prediction mode examination on the generated 8×8 blocks. On the other hand, the 16×16 blocks 3 and 5 have complexity degrees smaller than the threshold value, and therefore, the feature amount extraction unit 308 terminates the process of examining a prediction block size performed on the 16×16 blocks 1 and 3.

Extraction of Feature Amount of 8×8 Block

An examination process the same as that performed on the 32×32 block and the 16×16 blocks (step S1601 and step S1602) described above is performed. When it is determined that the 8×8 block is not the smallest prediction block size in step S1602 (NO in step S1602), the feature amount extraction unit 308 performs the process in step S1603. In step S1603, the feature amount extraction unit 308 calculates complexity degrees of the 8×8 blocks (8×8 blocks 6 to 13 illustrated in FIG. 17C) added as a candidate of the prediction block size for the prediction mode examination in step S1601. Then the feature amount extraction unit 308 compares the complexity degrees calculated in step S1603 and the predetermined threshold value with each other (step S1604) so that it is determined whether the complexity degrees of the 8×8 blocks 6 to 13 are equal to or larger than the threshold value (step S1605).

A process to be performed when it is determined that the complexity degrees are equal to or larger than the threshold value in step S1605 (YES in step S1605) and a process to be performed when it is determined that the complexity degrees are smaller than the threshold value (NO in step S1605) are the same as the processes in the feature amount extraction flow of the 32×32 block and the 16×16 blocks described above. Since the 8×8 block 6 illustrated in FIG. 17C has a complexity degree equal to or larger than the threshold value, the feature amount extraction unit 308 divides the 8×8 block 6 in quarters so as to generate 4×4 blocks (step S1606). Then the feature amount extraction unit 308 continuously performs the feature amount extraction and the process of selecting a prediction block size for the prediction mode examination on the generated 4×4 blocks. On the other hand, the 8×8 blocks 7 to 13 have complexity degrees smaller than the threshold value, and therefore, the feature amount extraction unit 308 terminates the process of determining a prediction block size performed on the 8×8 blocks 7 to 13.

Extraction of Feature Amount of 4×4 Block

A determination process the same as that performed on the 32×32 block, the 16×16 blocks, and 8×8 blocks (step S1601 and step S1602) described above is performed. When it is determined that the 4×4 block is the smallest prediction block size in step S1602 (YES in step S1602), the feature amount extraction unit 308 terminates the process of determining a prediction block size.

As described above, by repeatedly performing the processing flow illustrated in FIG. 16, the number of candidates of a block size to be subjected to the prediction mode examination may be reduced when compared with the case where combinations of all possible prediction block sizes and prediction modes are determined. In the case of the blocks illustrated in FIGS. 17A to 17D, the intra prediction mode determination apparatus 100 of this embodiment performs the prediction mode examination only on the 32×32 block 1, the 16×16 blocks 2 to 5, the 8×8 blocks 6 to 13, and the 4×4 blocks 14 to 17. Accordingly, the prediction block size and the prediction mode may be determined at higher speed when compared with the case where the prediction mode examination is performed on all the possible prediction block sizes in the intra prediction as described in the second embodiment.

Note that the feature amount extraction unit 308 of this embodiment performs detection of a simple portion using a complexity degree. However, this is only an example, and this embodiment is not limited to this. Specifically, candidates of a prediction block size may be selected using various general feature amounts (at least one of presence or absence of an edge, activity, a luminance average value, and the like) instead of the complexity degree. Furthermore, the threshold value used in step S1604 and step S1605 may be variable depending on a prediction block size and may be adaptively changed depending on an input image. Moreover, the feature amount extraction unit 308 of this embodiment successively calculates the degrees of complexity for individual prediction blocks. However, degrees of complexity for individual prediction block sizes may be calculated in advance and the comparison may be performed using results of the calculation.

Furthermore, as for the method for selecting (extracting) a prediction block size, the selection may be performed on the basis of a result of recognition of an object (a person or an object). Specifically, a face region of a person included in an input image may be recognized and a portion including a boundary between a face and a background is extracted as a small prediction block size as a result of the recognition, or a portion recognized as a background region in which change is small, such as sky, may be extracted as a large prediction block.

Fourth Embodiment

A configuration of an intra prediction mode determination apparatus 100 of a fourth embodiment is the same as that of the intra prediction mode determination apparatus 100 of the first embodiment (FIG. 1) described above other than a point in which reconstructed images of adjacent blocks are used to generate a prediction image. For example, when a prediction mode examination is performed on a prediction block 2 (a 4×4 block) of FIG. 8, prediction images in the prediction modes are generated using reconstructed images of blocks adjacent to the prediction block 2 in a left portion, an upper left portion, an upper portion, and an upper right portion (similarly to the process illustrated in FIGS. 5A to 5E). Specifically, a reconstructed image of a prediction block 1 (a 4×4 block) adjacent to the prediction block 2 in the left portion is required to generate the prediction image of the prediction block 2. Therefore, the prediction mode examination of the prediction block 2 and the prediction mode examination of the prediction block 1 may not be performed in parallel. Therefore, in this embodiment, making use of the fact that the individual prediction blocks are successively processed, prediction mode examinations for individual prediction blocks are performed at high speed using all 4×4 intra prediction units 1 to 32 for a prediction mode examination performed on a single specific prediction block where appropriate.

Hereinafter, a process of the intra prediction mode determination apparatus 100 of this embodiment will be described in detail using timing charts illustrated in FIGS. 18A and 18B and FIGS. 19A and 19B. For simplicity of description, in FIGS. 18A and 18B and FIGS. 19A and 19B, it is assumed that the intra prediction unit 101 of FIG. 1 includes 4×4 intra prediction units 1 to 32 (k=32), and processes of prediction blocks 1 to 5 illustrated in FIG. 8 will be described.

Figure 18A:
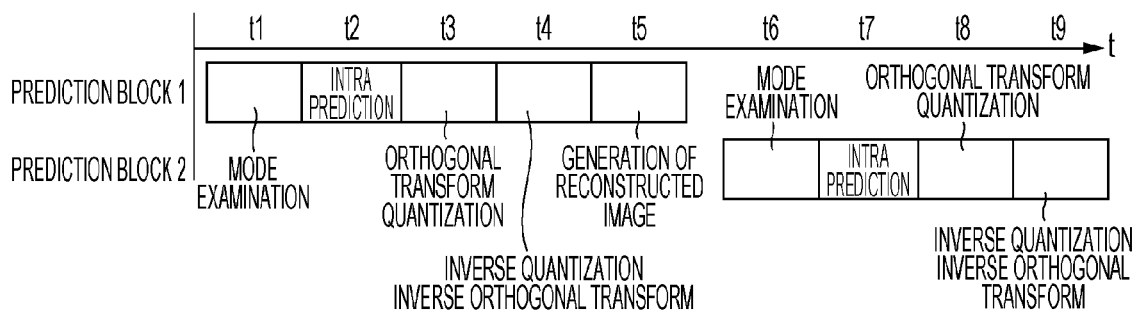
FIGS. 18A and 18B are timing charts illustrating a processing flow according to a fourth embodiment.

FIG. 18A is a timing chart illustrating outline of processes of the prediction blocks 1 and 2. First, at t1 of FIG. 18A, an intra prediction unit 101 generates prediction images using reconstructed images of corresponding adjacent blocks in a plurality of possible prediction modes of the prediction block 1 and calculates SADs between the prediction images and an input image. The intra prediction unit 101 compares the SADs for individual prediction modes with one another, and selects one of the prediction modes which has the smallest SAD as a prediction mode of the prediction block 1 (mode determination). Next, at t2, the intra prediction unit 101 performs intra prediction in accordance with the prediction mode selected at t1. Here, a prediction error corresponding to the prediction mode having the smallest SAD may be stored in the prediction mode determination unit 103. By this, although a circuit size is increased, the intra prediction is not required to be performed again for the selected prediction mode, and accordingly, a processing time may be reduced.

Next, at t3 to t5 of FIG. 18A, as described with reference to FIG. 2, orthogonal transform and quantization (t3) and inverse quantization and inverse orthogonal transform (t4) are performed on the prediction error generated at t2 in this order, and thereafter, a prediction residual and the prediction image are added to each other so that a reconstructed image is generated (t5). The reconstructed image generated at t5 is stored in a reconstructed image storage unit 106. Furthermore, a mode examination of the prediction block 2 is started after the reconstructed image of the prediction block 1 is obtained, and the process is performed similarly to the case of the prediction block 1.

Figure 18B:
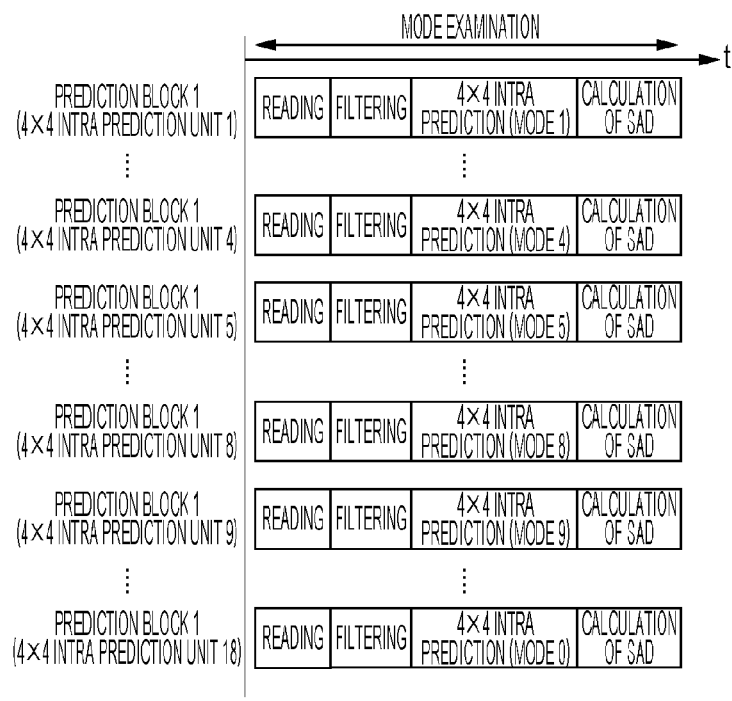

FIG. 18B is a diagram illustrating the mode examination process of the prediction block 1 (t1 of FIG. 18A) in detail. As illustrated in FIG. 18B, in this embodiment, all 4×4 intra prediction units 1 to 32 included in the intra prediction unit 101 may be used for prediction mode examinations of a single block. By this, examinations of a specific block in a plurality of prediction modes may be performed in parallel. In FIGS. 18A and 18B, 18 of the 32 4×4 intra prediction blocks are used for the process. Since the 18 4×4 intra prediction units are assigned, reading of reference pixels, a filter process on the read pixels, generation of a prediction image, and calculation of a SAD are performed in parallel in all the possible 18 prediction modes of the prediction block 1.

After the intra prediction of the prediction block 1 is terminated (after generation of a reconstructed image), a mode examination of the prediction block 2 is started. As with the prediction block 1, examinations in 18 prediction modes may be performed in parallel in the case of the mode examination of the prediction block 2.

Figure 19A:
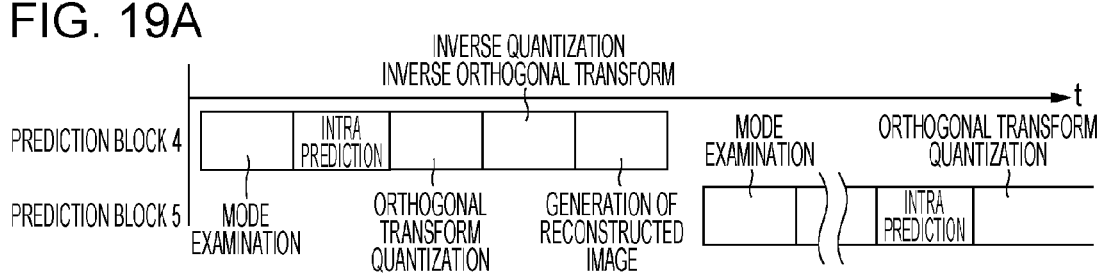
FIGS. 19A and 19B are timing charts illustrating another processing flow according to the fourth embodiment.
Figure 19B:
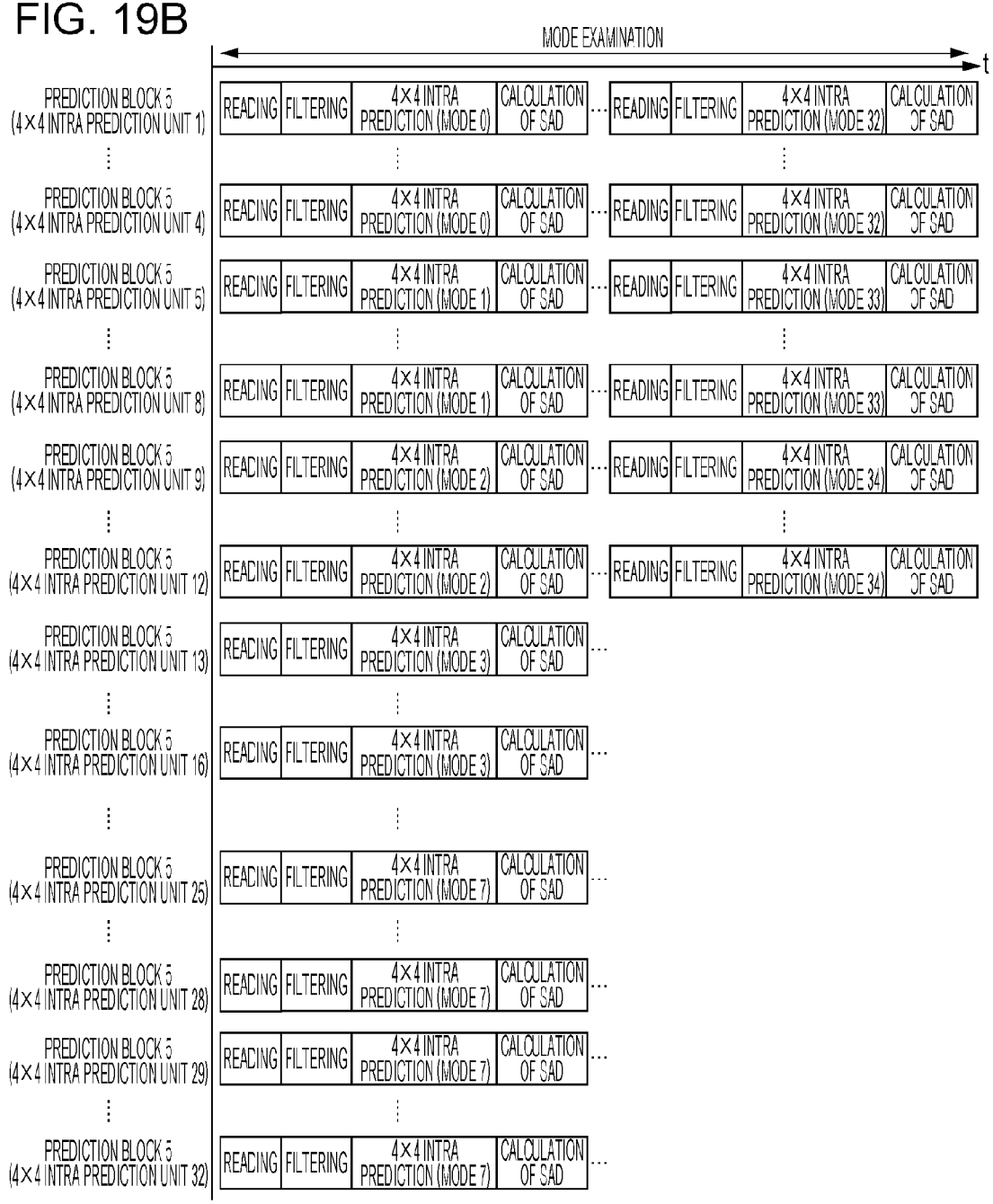

Next, processes of prediction blocks 4 and 5 will be described in detail with reference to FIGS. 19A and 19B. FIG. 19A is a timing chart illustrating outline of processes of the prediction blocks 4 and 5. The process of the prediction block 4 is the same as the process of the prediction block 1, and therefore, a description thereof is omitted. The process of the prediction block 5 is started after a reconstructed image of the prediction block 4 is generated. FIG. 19B is a timing chart illustrating processes of the 4×4 intra prediction units 1 to 32 in the prediction mode examination process of the prediction block 5 in detail. The prediction block 5 is an 8×8 block and may have 35 prediction modes. Therefore, examination processes are performed in every eight prediction modes in parallel among the possible prediction modes of the prediction block 5 using all the 4×4 intra prediction units 1 to 32.

As described above, even when examinations of a plurality of prediction blocks in various prediction modes may not be performed in parallel, prediction mode examinations of the prediction blocks may be performed at high speed by appropriately assigning the 4×4 intra prediction units 1 to k to a single prediction block.

Fifth Embodiment

In the first to fourth embodiments above, the processing units illustrated in FIGS. 1, 2, 3, 11, and 15 are configured by hardware. However, the processes performed by the processing units illustrated in FIGS. 1, 2, 3, 11, and 15 may be executed by computer programs.

Figure 21:
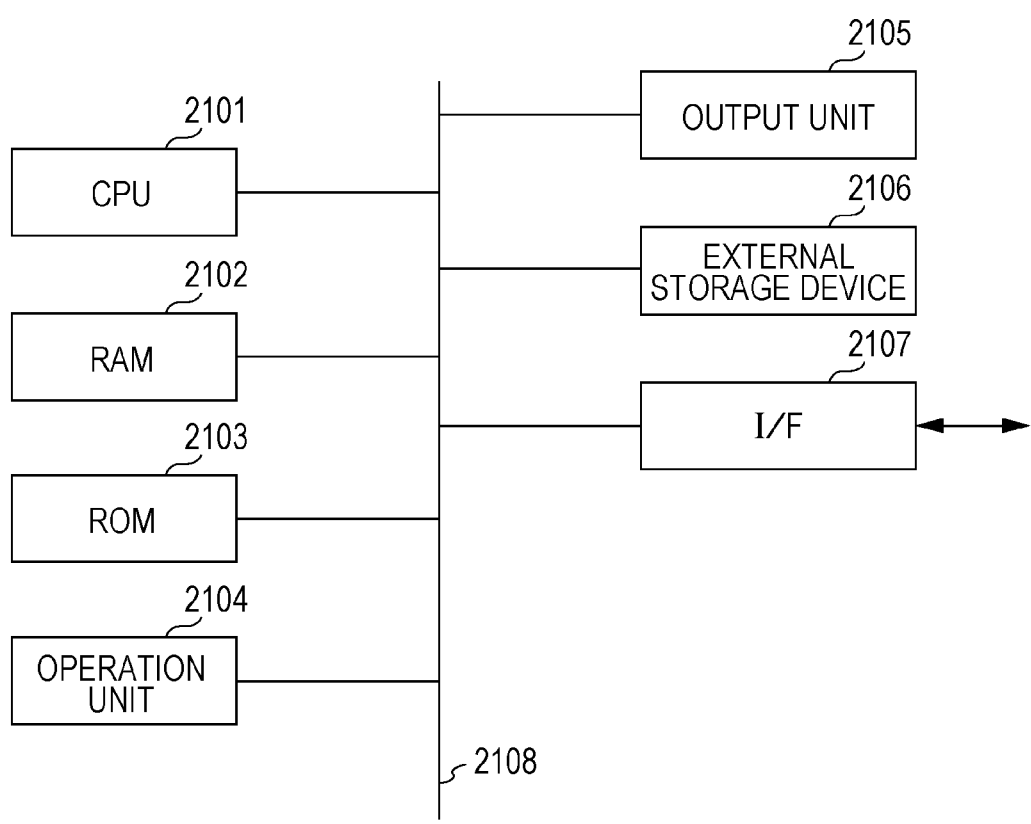
FIG. 21 is a block diagram illustrating a hardware configuration of a computer applicable to an intra prediction mode determination apparatus.

FIG. 21 is a block diagram illustrating a hardware configuration of a computer which executes the processes performed by the processing units included in the intra prediction mode determination apparatuses according to the first to fourth embodiments.

A CPU 2101 executes the processing units described above so as to control the entire computer using computer programs and data stored in a RAM 2102 and a ROM 2103. Furthermore, the CPU 2101 executes the processes described above to be performed by the image encoding apparatus and the intra prediction mode determination apparatus according to the foregoing embodiments. Specifically, the CPU 2101 functions as the processing units illustrated in FIGS. 1, 2, 3, 11, and 15.

The RAM 2102 has an area which temporarily stores computer programs and data loaded from an external storage device 2106, data externally obtained through an I/F (interface) 2107, and the like. The RAM 2102 further includes a work area used by the CPU 2101 to execute various processes. Specifically, the RAM 2102 may be assigned as a frame memory, for example, or conveniently provide other areas.

The ROM 2103 stores setting data, a boot program, and the like of the computer.

An operation unit 2104 including a keyboard and a mouse may input various instructions to the CPU 2101 by being operated by a user of the computer.

An output unit 2105 displays results of processes performed by the CPU 2101. The output unit 2105 is constituted by a liquid crystal display, for example.

The external storage device 2106 is a large-volume information storage device such as a hard disk drive device. The external storage device 2106 stores an operating system (OS) and computer programs which cause the CPU 2101 to realize the functions of the units illustrated in FIGS. 1, 2, 3, 11, and 15. Furthermore, the external storage device 2106 may store images to be processed.

The computer programs and the data stored in the external storage device 2106 are appropriately loaded into the RAM 2102 under control of the CPU 2101 and becomes a processing target of the CPU 2101.

A network, such as a LAN or the Internet, and other devices, such as a projection device and a display device, may be connected to the I/F 2107, and the computer obtains various information and transmits the information through the I/F 2107.

A bus 2108 is used to connect the units described above to one another.

With the configuration described above, the operations described above in the flowcharts are controlled mainly by the CPU 2101.

Other Embodiments

The first to fourth embodiments described above are applied to the HEVC method (a High Efficiency Video Coding method). However, the application of the first to the fourth embodiment is not limited to the HEVC.

Furthermore, in the first to fourth embodiments described above, the intra prediction is performed on prediction blocks larger than a 4×4 block size using a plurality of 4×4 intra prediction units (the 4×4 intra prediction units 1 to k). However, the 4×4 block size is not essential, and arbitrary m×n block size may be used (m and n are integers equal to or larger than 1). Therefore, when the foregoing embodiments are employed, intra prediction of an arbitrary am×bn block size (a and b are integers equal to or larger than 1) may be divided into intra prediction of m×n block size and blocks may be processed in parallel.

Furthermore, in the first to fourth embodiments described above, the intra prediction unit 101 includes k 4×4 intra prediction units. However, the first to fourth embodiments are not limited to this as long as the intra prediction unit 101 includes a plurality of intra prediction units.

Moreover, the image encoding apparatuses 200 and the intra prediction mode determination apparatuses 100 of the first to fourth embodiments may support intra prediction of a 4×4 block size and intra prediction of a block size larger than the 4×4 block size using an 8×8 intra prediction unit.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like. All or some of the processes of the first to fourth embodiments may be implemented as software. In particular, when the software is executed, generation of a prediction image in a unit of 4×4 block is executed as a multi-thread or a multi-task.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-262758, filed Dec. 19, 2013, which is hereby incorporated by reference herein in its entirety.

What is claimed is:

1. An intra prediction mode determination apparatus comprising:
   a feature amount obtaining unit configured to obtain a feature amount of an input image;
   a selecting unit configured to select prediction block sizes with which intra prediction is to be performed, the intra prediction being performed by using pixels in a frame that is the same as that of a block of a processing target in accordance with the feature amount obtained by the feature amount obtaining unit;
   a prediction unit configured to perform the intra prediction plural times by using a plurality of intra prediction modes with the prediction block sizes selected by the selecting unit; and
   a determination unit configured to determine an intra prediction mode for the block of the processing target from among a plurality of candidates in accordance with a result of the intra prediction performed plural times by the prediction unit.

2. The intra prediction mode determination apparatus according to claim 1,
   wherein the feature amount is obtained on the basis of at least one of a complexity degree, activity, an edge, or a pixel average value of the input image.

3. The intra prediction mode determination apparatus according to claim 1,
   wherein the feature amount is obtained on the basis of a result of recognition of an object which is a person or an object of the input image.

4. The intra prediction mode determination apparatus according to claim 1,
   wherein the plurality of prediction modes is supported by a high efficiency video coding method.

5. The intra prediction mode determination apparatus according to claim 1, further comprising:
   a plurality of the prediction units,
   wherein the determination unit determines the intra prediction mode for the block of the processing target in accordance with the result of the intra prediction performed plural times by the plurality of prediction units respectively,
   wherein, if the block of the processing target is a block of a second block size which is larger than a first block size, each of the plurality of the prediction units performs the intra prediction for the block of the first block size obtained by dividing the block of the second block size.

6. An intra prediction mode determination method to be performed in an intra prediction mode determination apparatus having a processor and memory that implements a feature amount obtaining unit, a selecting unit, a prediction unit and a determination unit, the method including:
   via the feature amount obtaining unit, obtaining a feature amount of an input image;
   via the selecting unit, selecting prediction block sizes with which intra prediction is to be performed, the intra prediction being performed by using pixels in a frame that is the same as that of a block of a processing target in accordance with the feature amount obtained by the feature amount obtaining unit;
   via the prediction unit, performing the intra prediction plural times by using a plurality of intra prediction modes with the prediction block sizes selected by the selecting unit; and
   via the determination unit, determining an intra prediction mode for the block of the processing target from among a plurality of candidates in accordance with a result of the intra prediction performed plural times by the prediction unit.

7. A non-transitory computer-readable storage medium containing computer executable instructions for controlling an intra prediction mode determination apparatus having a processor and memory, the computer-executable instructions when executed by the processor controlling the intra prediction mode determination apparatus to perform the following:
   via a feature amount obtaining unit, obtain a feature amount of an input image;
   via a selecting unit, select prediction block sizes with which intra prediction is to be performed, the intra prediction being performed by using pixels in a frame that is the same as that of a block of a processing target in accordance with the feature amount obtained by the feature amount obtaining unit;
   via a prediction unit, perform the intra prediction plural times by using a plurality of intra prediction modes with the prediction block sizes selected by the selecting unit; and
   via a determination unit, determine an intra prediction mode for the block of the processing target from among a plurality of candidates in accordance with a result of the intra prediction performed plural times by the prediction unit.

* * * * *